United States Patent
He et al.

(10) Patent No.: US 9,477,929 B2
(45) Date of Patent: Oct. 25, 2016

(54) GRAPH-BASED TRANSFER LEARNING

(75) Inventors: Jingrui He, Ossining, NY (US); Richard D. Lawrence, Ridgefield, CT (US); Yan Liu, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 981 days.

(21) Appl. No.: 13/619,142

(22) Filed: Sep. 14, 2012

(65) Prior Publication Data

US 2013/0013540 A1      Jan. 10, 2013

Related U.S. Application Data

(63) Continuation of application No. 12/938,063, filed on Nov. 2, 2010, now abandoned.

(60) Provisional application No. 61/359,130, filed on Jun. 28, 2010.

(51) Int. Cl.
*G06F 5/00*       (2006.01)
*G06N 5/00*      (2006.01)
*G06N 99/00*    (2010.01)

(52) U.S. Cl.
CPC .................................. *G06N 99/005* (2013.01)

(58) Field of Classification Search
CPC ........... G06N 5/04; G06N 7/005; G06N 5/02
See application file for complete search history.

(56) References Cited

U.S. PATENT DOCUMENTS

| | | | | |
|---|---|---|---|---|
| 2004/0013302 A1* | 1/2004 | Ma | ...................... | G06K 9/00463 382/209 |
| 2008/0117213 A1* | 5/2008 | Cirit | ........................ | G06T 11/20 345/440 |
| 2010/0115003 A1* | 5/2010 | Soules | ............... | G06F 17/30994 707/822 |

OTHER PUBLICATIONS

Office Action dated Jan. 9, 2013 received in a related U.S. Appl. No. 12/938,063.
Kdd cup 99. In http://kdd.ics.uci.edu/databases/kddcup99/kddcup99.html, last modified Oct. 28, 1999.
R. K. Ando and T. Zhang. A framework for learning predictive structures from multiple tasks and unlabeled data. Journal of Machine Learning Research, 6:1817-1853, Nov. 2005.
J. Baxter. A bayesian/information theoretic model of learning to learn via multiple task sampling. Mach. Learn., 28 (1):7-39, Jul. 1997.
J. Blitzer, M. Dredze, and F. Pereira. Biographies, bollywood, boom-boxes and blenders: Domain adaptation for sentiment classification. In ACL, Jun. 2007.
R. Caruana. Multitask learning. In Machine Learning, vol. 28, pp. 41-75, Jul. 1997.
W. Dai, G.-R. Xue, Q. Yang, and Y. Yu. Co-clustering based classification for out-of-domain documents. In KDD, pp. 210-219, Aug. 12-15, 2007.
W. Dai, Q. Yang, G. Xue, and Y. Yu, "Boosting for Transfer Learning," Proc. 24th Int'l Conf. Machine Learning, pp. 193-200, Jun. 2007.
W. Fan, I. Davidson, B. Zadrozny, and P. S. Yu. An improved categorization of classifier's sensitivity on sample selection bias. In ICDM, pp. 605-608, Washington, DC, USA, Nov. 27-30, 2005. IEEE Computer Society.
J. Gao, W. Fan, J. Jiang, and J. Han. Knowledge transfer via multiple model local structure mapping. In KDD, pp. 283-291, Aug. 24-27, 2008.
S.-I. Lee, V. Chatalbashev, D. Vickrey, and D. Koller. Learning a meta-level prior for feature relevance from multiple related tasks. In ICML, pp. 489-496, Jun. 20-24, 2007.
X. Liao, Y. Xue, and L. Carin. Logistic regression with an auxiliary data source. In ICML, pp. 505-512, Aug. 2005.
Q. Liu, X. Liao, and L. Carin. Semi-supervised multitask learning. In NIPS, Dec. 4, 2007.
J. luc Gauvain and C. hui Lee. Maximum a posteriori estimation for multivariate gaussian mixture observations of markov chains. IEEE Transactions on Speech and Audio Processing, 2:291-298, Apr. 1994.
A. M. Martinez. Recognition of partially occluded and/or imprecisely localized faces using a probabilistic approach. In CVPR, pp. 1712-1717, Jun. 13-15, 2000.
B. Pang, L. Lee, and S. Vaithyanathan. Thumbs up? sentiment classification using machine learning techniques. CoRR, cs.CL/0205070, Jul. 2002. pp. 79-86.
J. Rennie. 20 newsgroups. In http://people.csail.mit.edu/jrennie/20Newsgroups/, 2007. Last Modified Jan. 14, 2008.
B. Roark and M. Bacchiani. Supervised and unsupervised pcfg adaptation to novel domains. In NAACL, pp. 126-133, May-Jun. 2003.
S. Thrun. Is learning the n-th thing any easier than learning the first? in NIPS, pp. 640-646. MIT Press, Nov. 1995.
H. Wang, W. Fan, P. S. Yu, and J. Han. Mining concept-drifting data streams using ensemble classifiers. In KDD '03, Aug. 24-27, 2003.
P. Wu and T. G. Dietterich. Improving svm accuracy by training on auxiliary data sources. In ICML, pp. 871-878, Jul. 4-8, 2004.

(Continued)

*Primary Examiner* — Stanley K Hill
*Assistant Examiner* — Kalpana Bharadwaj
(74) *Attorney, Agent, or Firm* — Scully, Scott, Murphy & Presser, P.C.; Daniel P. Morris, Esq.

(57) ABSTRACT

Transfer learning is the task of leveraging the information from labeled examples in some domains to predict the labels for examples in another domain. It finds abundant practical applications, such as sentiment prediction, image classification and network intrusion detection. A graph-based transfer learning framework propagates label information from a source domain to a target domain via the example-feature-example tripartite graph, and puts more emphasis on the labeled examples from the target domain via the example-example bipartite graph. An iterative algorithm renders the framework scalable to large-scale applications. The framework propagates the label information to both features irrelevant to the source domain and unlabeled examples in the target domain via common features in a principled way.

22 Claims, 16 Drawing Sheets

(56) References Cited

OTHER PUBLICATIONS

B. Zadrozny. Learning and evaluating classifiers under sample selection bias. In ICML, p. 114, Jul. 4-8, 2004.
B. Zadrozny and C. Elkan. Learning and making decisions when costs and probabilities are both unknown. In KDD, pp. 204-213, New York, NY, USA, Jan. 2001. ACM.
J. Zhang, Z. Ghahramani, and Y. Yang. Learning multiple related tasks using latent independent component analysis. In NIPS, Dec. 5-8, 2005.
D. Zhou, J. Weston, A. Gretton, O. Bousquet, and B. Scholkopf. Ranking on data manifolds. In NIPS, Dec. 8-13, 2003.
X. Zhu, Z. Ghahramani, and J. Lafferty. Semi-supervised learning using gaussian fields and harmonic functions. In ICML, pp. 912-919, Aug. 21-24, 2003.
J. He, Y. Liu, and R. Lawrence, Graph-based Transfer Learning, CIKM'09, Nov. 2-6, 2009, Hong Kong, China, 937-946.
P. Melville, W. Gryc, and R. Lawrence, Sentiment Analysis of Blogs by Combining Lexical Knowledge with Text Classification, KDD'09, Jun. 28-Jul. 1, 2009, Paris, France.
V. Kindhwani and P. Melville, Document-Word Co-Regularization for Semi-supervised Sentiment Analysis, Data Mining, 2008, ICDM'08, Eighth IEEE International Conference, Dec. 15-19, 2008.

\* cited by examiner

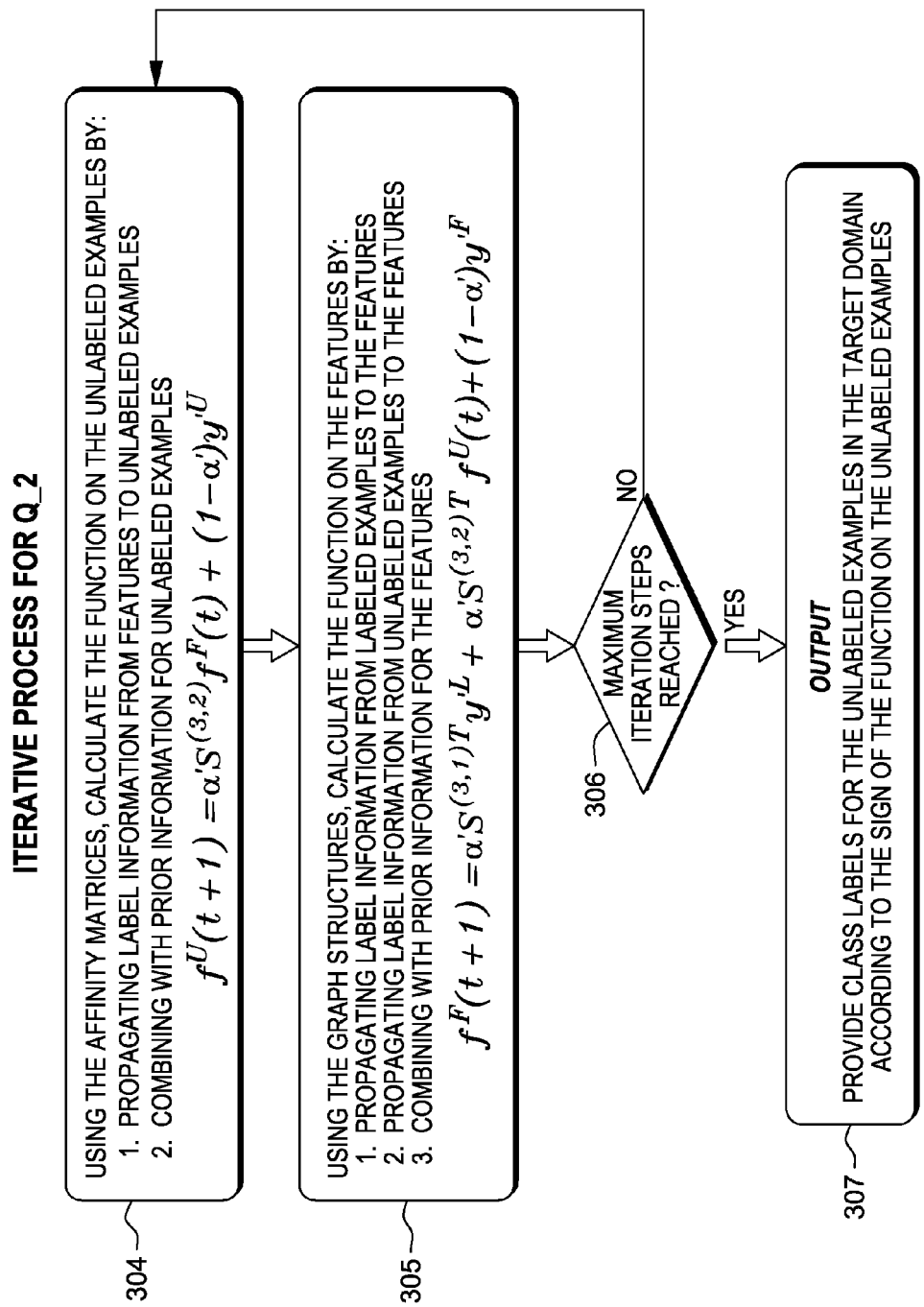

ALGORITHM 1 TRITER ALGORITHM FOR TRANSFER LEARNING

INPUT: THE SET OF EXAMPLES FROM THE SOURCE DOMAIN $X^S$ AND THE SET OF THEIR LABELS $Y^S$; THE SET OF EXAMPLES FROM THE TARGET DOMAIN $X^T$ AND THE SET OF LABELS FOR THE FIRST $\varepsilon n$ EXAMPLES $Y^T$; THE NUMBER OF ITERATION STEPS $t$; $\mu$.

OUTPUT: THE LABELS OF ALL THE UNLABELED EXAMPLES IN $X$.

1. SET $y^L(f^L)$ ACCORDING TO THE LABEL INFORMATION; SET $y^U$ AND $y^F$ ACCORDING TO PRIOR KNOWLEDGE, OR SIMPLY 0 IF SUCH INFORMATION IS NOT AVAILABLE; INITIALIZE $f^U(0) = y^U$ AND $f^F(0) = y^F$.
2. FOR $i = 1 : t$ DO
3.    CALCULATE $f^U(i)$ AND $f^F(i)$ ACCORDING TO EQUATIONS 3 AND 4.
4. END FOR
5. FOR $i = (\varepsilon n+1) : n$ DO
6.    IF THE FUNCTION VALUE OF $f^U(t)$ AT $x_i^T$ IS POSITIVE, $y_i^T = 1$; OTHERWISE, $y_i^T = -1$.
7. END FOR

FIG. 4

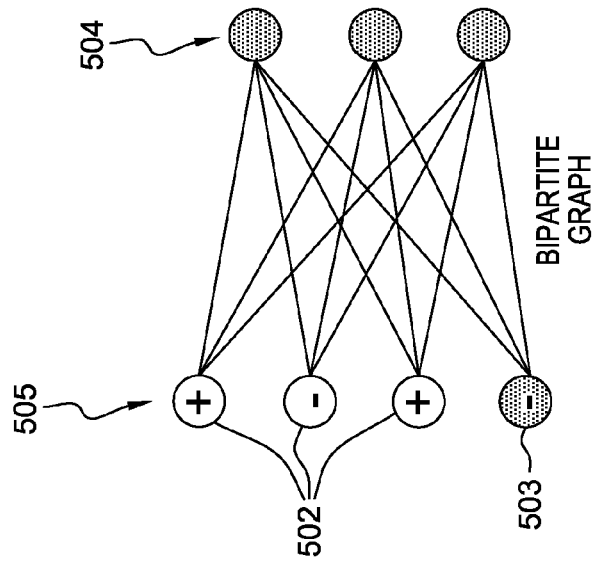
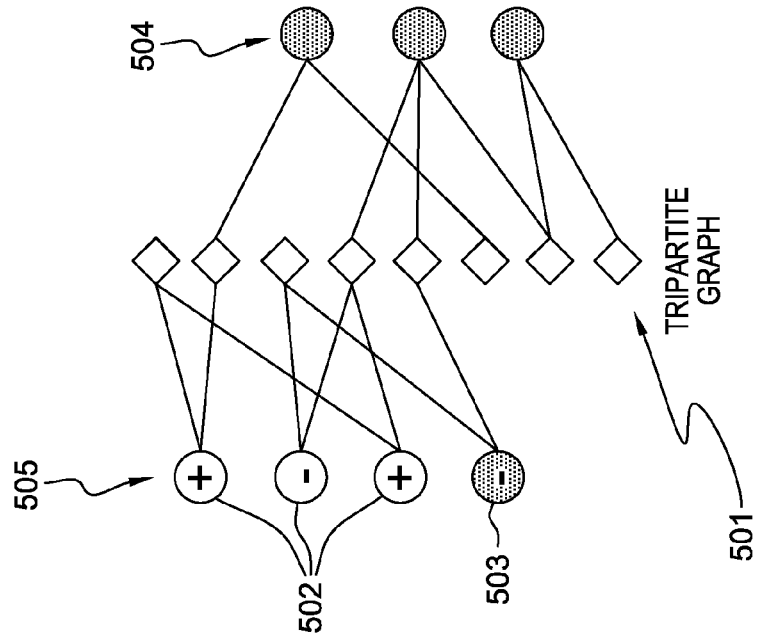

(a) $\gamma = 1$

FIG. 7 (a) τ = 5

TABLE 1. TRANSFER LEARNING TASKS

| AREA | SOURCE POSITIVE | SOURCE NEGATIVE | TARGET POSITIVE | TARGET NEGATIVE |
|---|---|---|---|---|
| SC | MOVIE (1000) | MOVIE (1000) | PRODUCT (5680) | PRODUCT (6047) |
| DC | comp.os.ms-windows.misc (572) | rec.autos (592) | comp.windows.x (592) | rec.motorcycles (596) |
|  | rec.sport.baseball (594) | sci.crypt (594) | rec.sport.hockey (598) | sci.electronics (591) |
|  | rec.sport.baseball (594) | talk.politics.misc (464) | rec.sport.hockey (598) | talk.religion.misc (376) |
| DC | NORMAL (1000) | PROBING (1000) | NORMAL (1000) | R2L (1000) |
|  | NORMAL (1000) | DOS (1000) | NORMAL (1000) | R2L (1000) |
|  | NORMAL (1000) | PROBING (500) DOS (500) | NORMAL (1000) | R2L (1000) |

FIG. 15

GRAPH-BASED TRANSFER LEARNING

CROSS REFERENCE TO RELATED APPLICATION

The present invention claims the benefit of U.S. patent application Ser. No. 12/938,063 filed Nov. 2, 2010 which claims the benefit of U.S. Provisional Patent Application No. 61/359,130 filed Jun. 28, 2010, the entire content and disclosure of which is incorporated herein by reference.

BACKGROUND

The invention relates to the field of machine learning, and in particular to transfer learning from a source domain to train a classifier for a target domain.

In the following, a number of publications will be discussed. This discussion is not a concession that it would be obvious to combine concepts from these publications.

Typically there are plenty of labeled examples in the source domain, whereas very few or no labeled examples in the target domain. Transfer learning is useful in many real applications. One example is sentiment analysis. Sentiment analysis may appear in the case of movie reviews. Movie reviews may be labeled, for instance by having received ratings from viewers (labels obtained according to the movie ratings). From such existing reviews, an attempt is made to compare or predict polarity of reviews about some other product, such as an electronic product. An article dealing with this type of problem is J. Blitzer, M. Dredze, and F. Pereira, "Biographies, bollywood, boom-boxes and blenders: Domain adaptation for sentiment classication," In *ACL*, 2007 ("Blitzer et al."). Another example might be in face recognition. In this area, there are many training images under certain lightening and occlusion conditions based on which a model is trained, but practically the model will be used under totally different conditions. An example of this area of application can be found in A. M. Martinez, "Recognition of partially occluded and/or imprecisely localized faces using a probabilistic approach," *CVPR*, pages 1712-1717, 2000

Transfer learning can fall into various scenarios, such as:
1. The source domain and the target domain have the same feature space and the same feature distribution, and only the labeling functions are different, such as multi-label text classification J. Zhang, Z. Ghahramani, and Y. Yang, "Learning multiple related tasks using latent independent component analysis." In *NIPS*, 2005;
2. The source domain and the target domain have the same feature space, but the feature distribution and the labeling functions are different, such as sentiment classification for different purposes, Blitzer et al., which sometimes is formalized as the problem that the training set and the test set have different feature distribution, W. Dai, Q. Yang, G.-R. Xue, and Y. Yu. Boosting for transfer learning. In *ICML*, pages 193-200, 2007.
3. The source domain and the target domain have different feature space, feature distribution and labeling functions, such as verb argument classification, S.-I. Lee, V. Chatalbashev, D. Vickrey, and D. Koller. Learning a meta-level prior for feature relevance from multiple related tasks. In *ICML*, pages 489-496, 2007.

SUMMARY

The present disclosure will focus primarily on improving machine learning in accordance with the second scenario.
1. In one embodiment, a computer method, includes carrying out operations on a computer, the operations including:
   maintaining machine readable embodiments on a medium of first and second graphs,
   the first graph comprising
       a first plurality of nodes corresponding to labeled and unlabeled examples from source and target domains;
       a second plurality of nodes corresponding to features; and
       a first plurality of edges connecting
           the nodes corresponding to the features
           to the nodes corresponding to the examples
       according to whether the features appear in the examples or not;
   the second graph comprising
       the first plurality of nodes corresponding to the examples; and
       a second plurality of edges connecting the examples, the edges being associated with indications that indicate whether connected examples are in a same domain or not;
   deriving labels for at least one target domain based on the first and second graphs; and
   presenting an embodiment of the labels as a result.

In another embodiment, a computer program product carries out operations, the computer program product includes a storage medium readable by a processing circuit and storing instructions to be run by the processing circuit for performing the method above.

In still a further embodiment a system includes:
at least one medium for storing data and program code;
at least one processor for performing operations in conjunction with the medium, in accordance with the method above.

Objects, advantages, and further embodiments will be apparent in the following.

BRIEF DESCRIPTION OF FIGURES

Embodiments will now be described by way of non-limiting example with respect to the following figures:

FIGS. 3A and 3B show an expansion of element 206 of FIG. 2.

FIG. 4 shows an algorithmic version of the flowcharts of FIGS. 2 and 3.

FIG. 5a shows a tri-partite graph

FIG. 5b shows a bi-partite graph

FIG. 15 shows a table of results.

DETAILED DESCRIPTION

Figure 1:
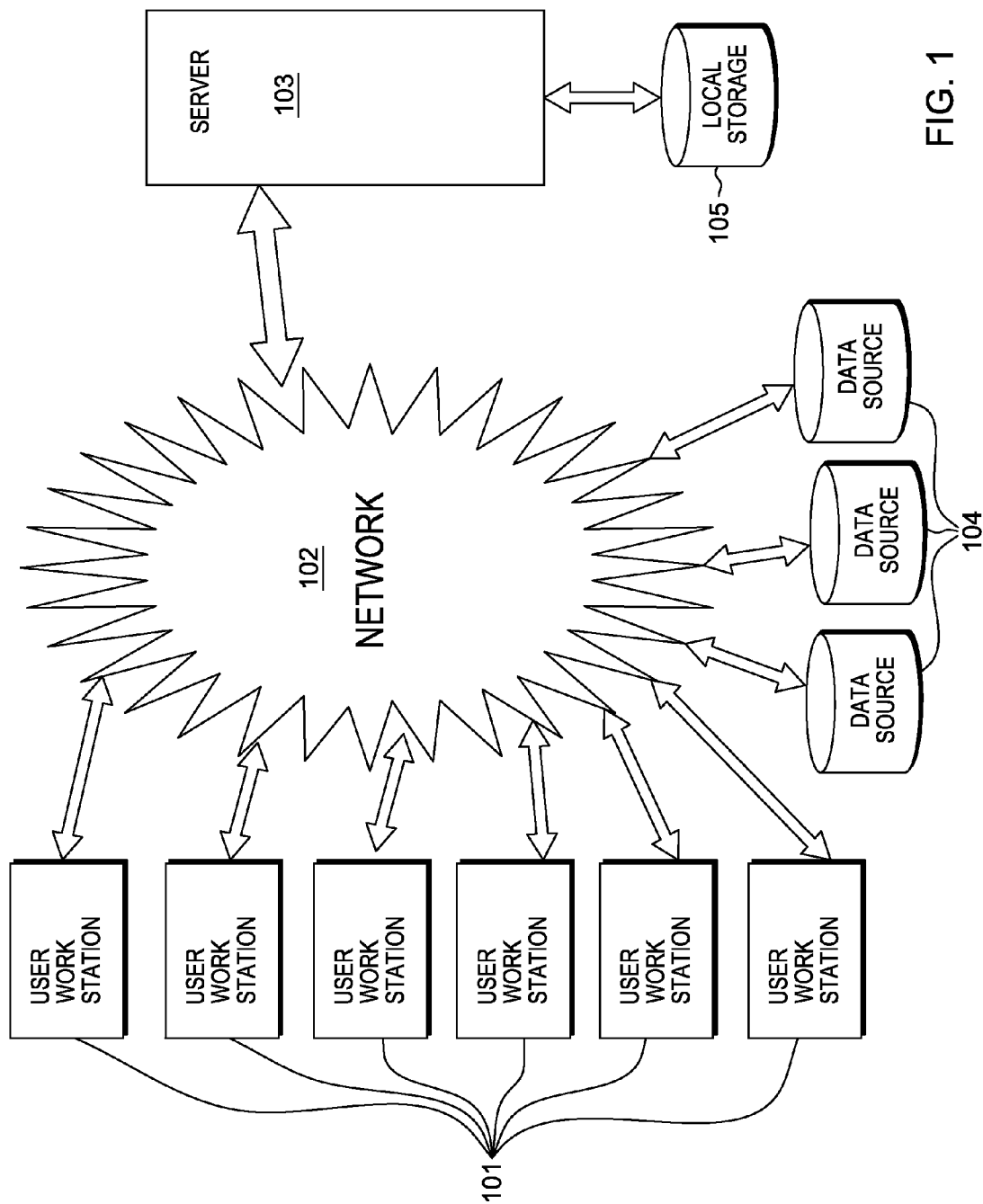
FIG. 1 shows a schematic system in which the invention may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a system in which the invention may be implemented. A plurality of user work stations 101 are coupled via an optional network 102 to at least one server 103. Records the system may be kept in various places such as data sources at 104, or storage 105 local to server 103. This drawing is not intended to imply limitations on numbers or types of components. For instance, work stations might be of any suitable sort, such as personal computers, cell phones, personal digital assistants, or televisions with set top boxes. The network might be the Internet or some other network such as a Local Area Network (LAN) within an organization. The server might also be of any suitable sort. There might be more or less of any illustrated component and multiple types of components might be used together. Additional components, not shown, may be present. Processing might be located in one machine or distributed over a number of locations.

The disclosed embodiment develops a graph-based transfer learning framework summarized below with respect to FIG. 2. This framework operates responsive to separate constructions of a) a tripartite graph FIG. 5a, including labeled examples, labeled features, and unlabeled examples and b) a bipartite graph FIG. 5b, including labeled examples and unlabeled examples.

Label information is propagated from labeled examples (mostly from the source domain) to unlabeled examples (from the target domain) via the features on the tripartite graph. Domain related constraints are imposed on the bipartite graph. The result is a machine learned classification function that takes values on all the unlabeled examples in the target domain. Finally, these examples are labeled according to the sign of the function values.

FIG. 5a shows an example of the tripartite graph. The diamond-shaped nodes 501 correspond to the feature nodes, the lighter circle nodes 502 correspond to the examples from the source domain, and the darker circle nodes 503, 504 correspond to the examples from the target domain. The labeled nodes 505 are on the left hand side, the feature nodes 501 are in the middle, and the unlabeled nodes 504 are on the right hand side.

The intuition of the graph can be explained as follows. Consider sentiment classification in different domains as an example. Each of the diamond-shaped nodes in FIG. 5a corresponds to a unique word; the lighter circle nodes correspond to labeled movie reviews; and the darker circle nodes correspond to product reviews, which may be completely or partly unlabelled. The labeled reviews on the left hand side of FIG. 5a propagate their label information to the unlabeled product reviews via the feature nodes. Each of the two domains may have some unique words that never occur in the other domain. For example, the word 'actor' often occurs in a movie review, but may never occur in a product review; similarly, the word 'polyethylene' may occur in a product review, but may never be seen in a movie review.

Based on this graph structure, the label information can be propagated to the domain-specific words, i.e. the words irrelevant to the movie reviews, which will help classify the unlabeled product reviews.

FIG. 5b shows an example of the bipartite graph which has the same labeled and unlabeled nodes as in FIG. 5a. Similarly, the lighter circle nodes 502 correspond to the examples from the source domain, and the darker circle nodes 503 correspond to the examples from the target domain. The labeled nodes 505 on the left hand side are connected to each unlabeled node 504 on the right hand side. Again take sentiment classification in different domains as an example. The labeled nodes correspond to all the labeled reviews, most of which are movie reviews, and the unlabeled nodes correspond to all the unlabeled product reviews. Edge weights are set to reflect the domain related similarity between two reviews. Therefore, if two reviews are both product reviews, one labeled and one unlabeled, their edge weight would be large; whereas if two reviews are from different domains, the movie review labeled and the product review unlabeled, their edge weight would be small. These edge weights are hoped to facilitate making better use of the labeled product reviews to construct the classification function for the unlabeled product reviews.

Figure 2:
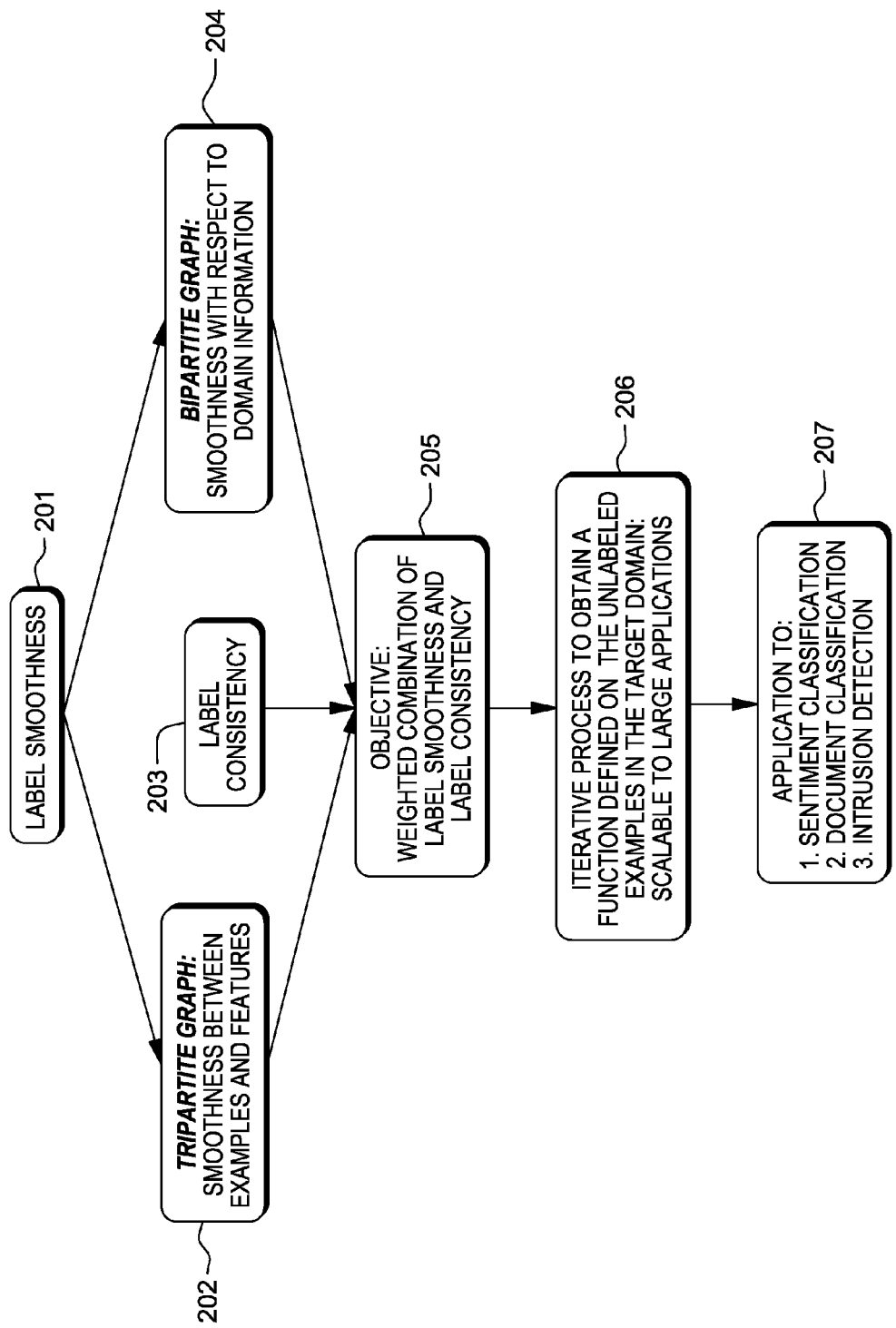
FIG. 2 shows a conceptual diagram.

In FIG. 2, boxes 201, 202, 203 and 204 correspond to terms of the objective function. There are two types of terms, label smoothness 201 and label consistency 203. Boxes 202 and 204 are specifications of particular smoothness constraints, with respect to the tri-partite graph at 202 and with respect to the bi-partite graph at 204. With respect to element 202, the construction of the graph is in Subsection 1.2. The smoothness constraint imposed on this graph—in terms of objective Q_1—is shown in Subsection 1.3. Subsection 1.3 introduces the iterative procedure to optimize Q_1. With respect to element 204, more discussion appears below at section 2.1 Q_1 combines label smoothness on the tripartite graph and label consistency, which is described in Subsection 1.3. Q_1 is one part of Q_2. And the remaining part of Q_2 is label smoothness on the bipartite graph, which is described in the first 2 paragraphs of Subsection 2.2. Then, at 205, an objective is established, which is a weighted combination of label smoothness and label consistency. This objective (Q_2) is introduced in Subsection 2.2. This subsection also discusses how to modify the iterative procedure for solving Q_1 in order to solve Q_2. At 206, an iterative process is undertaken to obtain a function defined on the unlabeled examples in the target domain and that is scalable to large applications. The original iterative procedure for solving Q_1—which only considers the smoothness on the tripartite graph—is introduced in Subsection 1.3. The adaptation of this iterative process in order to solve Q_2 (which considers the smoothness on both the tripartite graph and the bipartite graph) is introduced at the end of Subsection 2.2—Theorem 2. Box 206 is expanded in FIGS. 3A and 3B. At 207, resulting labels are applied to some field such as sentiment classification; document classification, or intrusion detection. This is discussed in section 3.

Figure 3A:
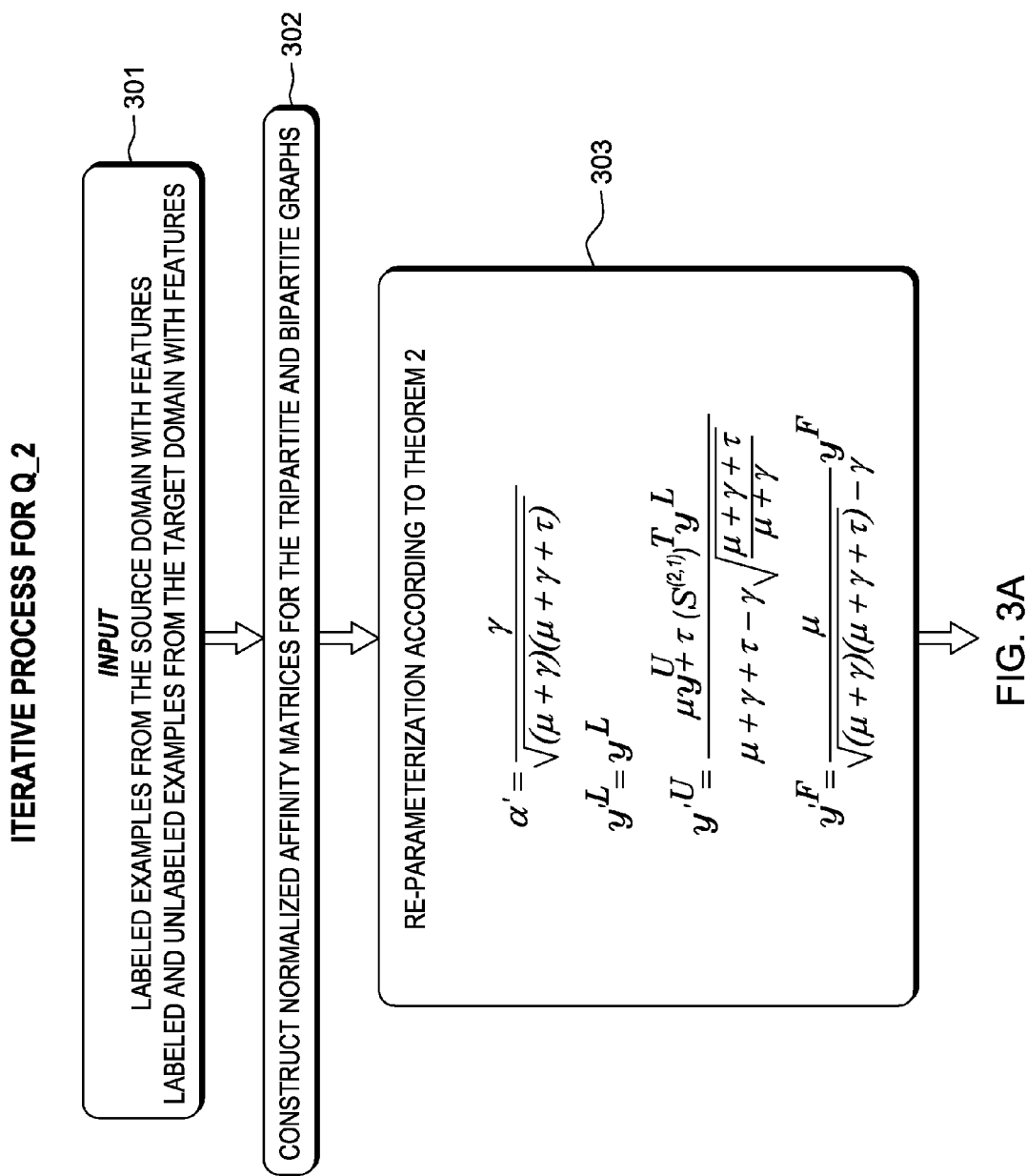

FIG. 3A shows an expansion of box 206. At 301, inputs are labeled examples from the source domain with features; and labeled and unlabeled examples from the target domain with features. These inputs are as modified during preceding smoothing and consistency operations. At 302, affinity matrices, discussed more below, are constructed for the tripartite and bipartite graphs. At 303, re-parameterization is conducted in accordance with theorem 2, discussed more below, to wit.

$$\alpha' = \frac{\gamma}{\sqrt{(\mu + \gamma)(\mu + \gamma + \tau)}}$$

$$y'^L = y^L$$

$$y'^U = \frac{\mu y^U + \tau (S^{(2,1)})^T y^L}{\mu + \gamma + \tau - \gamma \sqrt{\frac{\mu + \gamma + \tau}{\mu + \gamma}}}$$

$$y'^F = \frac{\mu}{\sqrt{(\mu + \gamma)(\mu + \gamma + \tau)} - \gamma} y^F$$

At 304, FIG. 3B, using the affinity matrices, the function is calculated on the unlabeled examples by:
1. Propagating label information from features to unlabeled examples; and
2. Combining with prior information for unlabeled examples, which can be expressed in terms of the following equation:

$$f^U(t+1) = \alpha' S^{(3,2)} f^F(t) + (1-\alpha') y'^U$$

discussed further below as equation (3).

At 304, using the graph structures, the function is calculated on the features by:
1. Propagating label information from labeled examples to the features;
2. Propagating label information from unlabeled examples to the features; and
3. Combining with prior information for the features, which can be expressed in terms of the following equation:

$$f^F(t+1) = \alpha' (S^{(3,1)})^T y^L + \alpha' (S^{(3,2)})^T f^U(t) + (1-\alpha') y'^F$$

Discussed further below as equation (4).

In the proposed framework, there are two types of functions. One is defined on all the unlabeled examples from the target domain, and the other is defined on the features. Both of the two functions will be refined in the iterative process.

304 refines the function defined on the unlabeled examples; whereas 305 refines the function defined on the features. At 306, a test is performed as to whether a threshold number of iterations is reached. If the threshold has not been reached, iteration returns to 303. If the threshold has been reached, results are converted to outputs at 307. The outputs are in the form of class labels for the unlabeled examples in the target domain according to a sign of the function on the unlabeled examples The described framework is semi-supervised since it makes use of unlabeled examples to help propagate the label information. Furthermore, in the second transfer learning scenario, as described above, the labeling functions in different domains may be closely related to the feature distribution; thus unlabeled examples are helpful in constructing the classifiers. However, the framework of the disclosed embodiment is different from traditional semi-supervised learning due to the fact that labeled examples from different domains are treated differently in order to construct an accurate classifier in the target domain, whereas in traditional semi-supervised learning, all the labeled examples are treated in the same way. The framework is also non-parametric in nature, which makes it more flexible than parametric models.

The transfer learning framework of the present disclosure differs from existing graph-based methods. For example, the authors of J. Gao, W. Fan, J. Jiang, and J. Han, "Knowledge transfer via multiple model local structure mapping," KDD, pages 283-291, 2008 proposed a locally weighted ensemble framework to combine multiple models for transfer learning, where the weights of different models are approximated using a graph-based approach. Q. Liu, X. Liao, and L. Carin, "Semi-supervised multitask learning", pp. 937-944, NIPS, 2007, proposed a semi-supervised multi-task learning framework, where t-step transition probabilities in a Markov random walk were incorporated into the neighborhood-conditional likelihood function to find the optimal parameters. Generally speaking, these methods do not try to propagate the label information to the features irrelevant to the source domain and the unlabeled examples in the target domain via the common features. Some non-graph-based methods try to address this problem in an ad-hoc way, such as Blitzer at al., whereas the present disclosure provides a principled way to do the propagation.

The rest of the paper is organized as follows. Firstly, Section 1 introduces the tripartite graph and a simple iterative algorithm for transfer learning based on this graph. Then in Section 2, the graph-based transfer learning framework is presented and associated with the iterative algorithm from Section 1. Experimental results are shown in Section 3, followed by some discussion.

1. TRANSFER LEARNING WITH TRIPARTITE GRAPH

This section uses the tripartite graph that propagates the label information from the source domain to the target domain via the features. Using this graph, a classification function is obtained that takes values on all the unlabeled examples from the target domain. Then the section presents an iterative algorithm to find the classification function efficiently.

1.1 Notation

Let denote the set of examples from the source domain, i.e. $X^S = \{x_1^S, \ldots, x_m^S\} \subset \mathbb{R}^d$, where m is the number of examples from the source domain, and d is the dimensionality of the feature space. Let $Y^S$ denote the labels of these examples, i.e. $Y^S = \{y_1^S, \ldots, y_m^S\} \subset \{-1, 1\}^m$, where $y_i^S$ is the class label of $x_i^S$, $1 \leq i \leq m$. Similarly, for the target domain, let $X^T$ denote the set of examples, i.e. $X^T = \{x_1^T, \ldots, x_n^T\} \subset \mathbb{R}^d$, where n is the number of examples from the target domain. Among these examples, only the first $\epsilon n$ examples are labeled, i.e. $Y^T = \{y_1^T, \ldots, y_{\epsilon n}^T\} \subset \{-1, 1\}^{\epsilon n}$, where $y_i^T$ is the class label of $x_i^T$, $1 \leq i \leq \epsilon n$.

Here $0 \leq \epsilon \ll 1$, i.e. only a small fraction of the examples in the target domain are labeled, and $\epsilon = 0$ corresponds to no labeled examples in the target domain. The presented method seeks to find a classification function for all the unlabeled examples in $X^T$ with a small error rate.

1.2 Tripartite Graph

Let $G^{(3)} = \{V^{(3)}, E^{(3)}\}$ denote the undirected tripartite graph, where $V^{(3)}$ is the set of nodes in the graph, and $E^{(3)}$ is the set of weighted edges. $V^{(3)}$ consists of three types of nodes: the labeled nodes, i.e. the nodes that correspond to the labeled examples (most of them are from the source domain); the feature nodes, i.e. the nodes that correspond to the features; and the unlabeled nodes, i.e. the nodes that correspond to the unlabeled examples from the target domain. Both the labeled nodes and the unlabeled nodes are connected to the feature nodes, but the labeled nodes are not connected to the unlabeled nodes, and the nodes of the same type are not connected either. Furthermore, there is an edge between a labeled (unlabeled) node and a feature node if and only if the corresponding example has that feature, i.e. $x_{i,j}^S \neq 0$ ($x_{i,j}^T \neq 0$), where $x_{i,j}^S$ ($x_{i,j}^T$) is the $j^{th}$ feature component of $x_i^S$ ($x_i^T$), and the edge weight is set to $x_{i,j}^S$ ($x_{i,j}^T$). Here it is assumed that the edge weights are non-negative. This is true in many applications, such as document analysis where each feature corresponds to a unique word and the edge weight is binary or equal to the Term frequency—inverse document frequency "tfidf" value. In a general setting, this may not be the case. "Term frequency—inverse document frequency" is a way of calculating the weight of a word in a document, which is often used in information retrieval and text mining. It is introduced in *Introduction to Information Retrieval*, Christopher D. Manning, Prabhakar Raghavan, and Hinrich Schutze, Cambridge University Press. 2008. However, the skilled artisan could perform a linear transformation to the features and make them nonnegative.

Given the tripartite graph, an affinity matrix $A^{(3)}$ is established. The size of the affinity matrix is derived from: $(m+n+d) \times (m+n+d)$. The first $m+\epsilon n$ rows (columns) correspond to the labeled nodes, the next $n-\epsilon n$ rows (columns) correspond to the unlabeled nodes, and the remaining d rows (columns) correspond to the feature nodes. Therefore, $A^{(3)}$ has the following block structure $$A^{(3)} = \begin{bmatrix} 0_{(m+\epsilon n) \times (m+\epsilon n)} & 0_{(m+\epsilon n) \times (n-\epsilon n)} & A^{(3,1)} \\ 0_{(n-\epsilon n) \times (m+\epsilon n)} & 0_{(n-\epsilon n) \times (n-\epsilon n)} & A^{(3,2)} \\ (A^{(3,1)})^T & (A^{(3,2)})^T & 0_{d \times d} \end{bmatrix}$$

where $0_{a \times b}$ is an $a \times b$ 0 matrix, $A^{(3,1)}$ and $A^{(3,2)}$ are both sub-matrices of $A^{(3)}$, and $(\bullet)^T$ is the transpose of a matrix. Let $A_{i,j}^{(3,1)}$ ($A_{i,j}^{(3,2)}$) denote the elements in the $i^{th}$ row and the $j^{th}$ column of $A^{(3,1)}$ ($A^{(3,2)}$). Based on the discussion above, $A_{i,j}^{(3,1)} = x_{i,j}^S$ and $A_{i,j}^{(3,2)} = x_{i,j}^T$. The elements of $A^{(3)}$ are non-negative. Furthermore, define diagonal matrix $D^{(3)}$, which is $(m+n+d) \times (m+n+d)$. Its diagonal element $D_i^{(3)} = \sum_{j=1}^{m+n+d} A_{i,j}^{(3)}$, $i=1, \ldots, m+n+d$, where $A_{i,j}^{(3)}$ denote the element in the $i^{th}$ row and the $j^{th}$ column of $A^{(3)}$. Similar as $A^{(3)}$, $D^{(3)}$ has the following block structure $$D^{(3)} = \begin{bmatrix} D^{(3,1)} & 0_{(m+\epsilon n)\times(n-\epsilon n)} & 0_{(m+\epsilon n)\times d} \\ 0_{(n-\epsilon n)\times(m+\epsilon n)} & D^{(3,2)} & 0_{(n-\epsilon n)\times d} \\ 0_{d\times(m+\epsilon n)} & 0_{d\times(n-\epsilon n)} & D^{(3,3)} \end{bmatrix}$$

where $D^{(3,1)}$, $D^{(3,2)}$ and $D^{(3,3)}$ are diagonal matrices whose diagonal elements are equal to the row sums of $A_{i,j}^{(3,1)}$, $A_{i,j}^{(3,2)}$, and $(A^{(3,1)})^T + (A^{(3,2)})^{-T}$ respectively. Finally, define the normalized affinity matrix $S^{(3)} = (D^{(3)})^{-1/2} A^{(3)} (D^{(3)})^{-1/2}$, which also has the following block structure $$S^{(3)} = \begin{bmatrix} 0_{(m+\epsilon n)\times(m+\epsilon n)} & 0_{(m+\epsilon n)\times(n-\epsilon n)} & S^{(3,1)} \\ 0_{(n-\epsilon n)\times(m+\epsilon n)} & 0_{(n-\epsilon n)\times(n-\epsilon n)} & S^{(3,2)} \\ (S^{(3,1)})^T & (S^{(3,2)})^T & 0_{d\times d} \end{bmatrix}$$

where $S^{(3,1)} = (D^{(3,1)})^{-\frac{1}{2}} A^{(3,1)} (D^{(3,3)})^{-\frac{1}{2}}$, and $S^{(3,2)} = (D^{(3,2)})^{-\frac{1}{2}} A^{(3,2)} (D^{(3,3)})^{-\frac{1}{2}}$.

Similar as $A^{(3)}$, the elements of $S^{(3)}$ are also non-negative.

1.3 Objective Function $Q_1$

Given the tripartite graph and the corresponding affinity matrix, three functions $f_L$, $f_F$ and $f^U$ are defined, which take values on the labeled nodes, the feature nodes, and the unlabeled nodes respectively. The function value of $f^U$ will be used to classify the unlabeled examples in the target domain, and the function value of $f^F$ can be used to infer the polarity of the features. Similarly, three vectors $y^L$, $y^F$ and $y^U$ are defined, whose lengths are equal to the number of labeled nodes m+εn, the number of feature nodes d, and the number of unlabeled nodes n−εn respectively. The elements of $y^L$ are set to be the class label of the corresponding labeled example, whereas the elements of $y^F$ and $y^U$ could reflect prior knowledge about the polarity of the features and the unlabeled examples, or simply 0 if such information is not available. For the sake of notation simplicity, let $f = [(f^L)^T, (f^U)^T, (f^F)^T]^T$ and $y = [(y^L)^T, (y^U)^T, (y^F)^T]^T$.

To find the classification function with a low error rate, one approach is to minimize the following objective function.

$$Q_1(f) = \frac{1}{2} \sum_{i,j=1}^{m+n+d} A_{ij}^{(3)} \left( \frac{f_i}{\sqrt{D_i^{(3)}}} - \frac{f_j}{\sqrt{D_j^{(3)}}} \right)^2 + \mu \sum_{i=1}^{m+n+d} (f_i - y_i)^2$$

$$= f^T (I_{(m+n+d)\times(m+n+d)} - S^{(3)}) f + \mu \|f - y\|^2$$

where $\mu$ is a small positive parameter, $I_{a\times b}$ is an a×b identity matrix, and $f_i$ and $y_i$ are the $i^{th}$ element of $f$ and $y$ respectively. This function is motivated by D. Zhou, J. Weston, A. Gretton, O. Bousquet, and B. Scholkopf, "Ranking on data manifolds," NIPS, 2003 ("Zhou et al.").

This objective function can be interpreted as follows. The first term of $Q_1$, $f^T (I_{(m+n+d)\times(m+n+d)} - S^{(3)}) f$, measures the label smoothness of $f$. In other words, neighboring nodes on the graph should have similar $f$ values. The second term, $\mu \|f - y\|^2$, measures the consistency of $f$ with the label information and the prior knowledge encoded in $y$. It is hoped that minimizing $Q_1$ will yield a smooth classification function $f^U$ with a small error rate.

The assignment, $f^L = y^L$, is believed to make better use of the label information in $y^L$. This modification is one difference between the present method and the manifold ranking algorithm proposed in Zhou et all, where each element of $f$ needs to be optimized. Minimizing $Q_1$ with the above constraint, yields the following lemma.

LEMMA 1. If $f^L = y^L$, $Q_1$ is minimized at $$f^{U*} = (I_{(n-\epsilon n)\times(n-\epsilon n)} - \alpha^2 S^{(3,2)} (S^{(3,2)})^T)^{-1} \qquad (1)$$

$$((1-\alpha)y^U + \alpha(1-\alpha)S^{(3,2)} y^F + \alpha^2 S^{(3,2)} (S^{(3,1)})^T y^L)$$

$$f^{F*} = (I_{d\times d} - \alpha^2 (S^{(3,2)})^T S^{(3,2)})^{-1} \qquad (2)$$

$$((1-\alpha)y^F + \alpha(S^{(3,1)})^T y^L + \alpha(1-\alpha)(S^{(3,2)})^T y^U)$$

where $\alpha = \frac{1}{1+\mu}$.

In Lemma 1, obtaining $f^{U*}$ and $f^{F*}$, requires matrix inversions. This is computationally expensive especially when the number of unlabeled examples in $X^T$ or the number of features is very large. To address this problem, the following iteration steps are proposed to obtain the optimal solutions.

$$f^U(t+1) = \alpha S^{(3,2)} f^F(t) + (1-\alpha) y^U \qquad (3)$$

$$f^F(t+1) = \alpha (S^{(3,1)})^T y^L + \alpha (S^{(3,2)})^T f^U(t) + (1-\alpha) y^F \qquad (4)$$

where $f^U(t)$ and $f^F(t)$ denote $f^U$ and $f^F$ at the $t^{th}$ iteration. The two equations can be interpreted as follows. Based on Equation 3, if an example has many positive (negative) features or it is believed to be positive (negative) a priori, its function value would be large (small), indicating that it is a positive (negative) example. Based on Equation 4, if a feature is contained in many positive (negative) labeled examples, or it is shared by many unlabeled examples with large (small) function values, or it is believed to be positive (negative) a priori, its function value would be large (small). In this way, the label information is gradually propagated to the unlabeled examples in the target domain and the features irrelevant to the source domain via the common features on the tripartite graph.

THEOREM 1. When t goes to infinity, $f^U(t)$ converges to $f^{U*}$ and $f^F(t)$ converges to $f^{F*}$.

Comparing the above iterative steps with Equations 1 and 2, reveals that they avoid solving matrix inversions directly. In experiments, the number of iteration steps until convergence is proved to be consistently less than 30. Therefore, these iterative steps are an efficient alternative to Equations 1 and 2.

Based on Equations 3 and 4, the TRITER (TRIpartite-graph-based TransfER learning) algorithm to minimize $Q_1$, which is shown in Algorithm 1 in FIG. 4. It works as follows. First, $y^L(f^L)$, $y^U$ and $y^F$ are set according to the label information or prior knowledge. $f^U(0)$ and $f^F(0)$ are initialized to $y^U$ and $y^F$ respectively. Next, $f^U$ and $f^F$ are updated according to Equations 3 and 4. Finally, all the unlabeled examples in $X^T$ are classified according to the corresponding elements in $f^U$.

2. GRAPH-BASED TRANSFER LEARNING FRAMEWORK

In Section 1, a tripartite graph is introduced that connects the examples from the source domain and the target domain with the features, along with the TRITER algorithm that minimizes the objective function $Q_1$ efficiently. Although simple and straight-forward, $Q_1$ is not best suited for transfer learning. This is because the label information from the source domain and the target domain is propagated in the same way. If the labeled examples from the source domain dominate the labeled nodes, the label information of the small number of labeled examples from the target domain would be flooded, and the resulting classification function for the target domain may be largely biased. In other words, since the goal is to construct an accurate classifier in the target domain, the labeled examples from the same domain should be more important than the labeled examples from different domains.

To address this problem, in this section, the graph-based transfer learning framework. In this framework is discussed further, in addition to the tripartite graph, a bipartite graph is presented that makes better use of the labeled examples from the target domain. Based on the two graphs, an objective function $Q_2$ and optimal solutions are presented.

Furthermore, under certain conditions, the solutions to $Q_2$ can be obtained by minimizing a slightly modified version of $Q^1$ via the TRITER algorithm.

2.1 Bipartite Graph

Let denote the undirected bipartite graph, where $V^{(2)}$ is the set of nodes in the graph, and $E^{(2)}$ is the set of weighted edges. $V^{(2)}$ consists of two types of nodes: the labeled nodes which correspond to the labeled examples from both the source domain (majority) and the target domain (minority); the unlabeled nodes which correspond to the unlabeled examples from the target domain. Each labeled node is connected to each unlabeled node, with the edge weight indicating the domain related similarity between the two examples, whereas the same type of nodes are not connected.

Let $A^{(2)}$ denote the affinity matrix for the bipartite graph, which is $(m+n)\times(m+n)$. The first $m+\epsilon n$ rows (columns) correspond to the labeled nodes, and the remaining $n-\epsilon n$ rows (columns) correspond to the unlabeled nodes. According to the structure of the bipartite graph, $A^{(2)}$ has the following form.

$$A^{(2)} = \begin{bmatrix} 0_{(m+\epsilon n)\times(m+\epsilon n)} & A^{(2,1)} \\ (A^{(2,1)})^T & 0_{(n-\epsilon n)\times(n-\epsilon n)} \end{bmatrix}$$

where $A^{(2,1)}$ is the sub-matrix of $A^{(2)}$. The elements of $A^{(2)}$ are set to be non-negative. Let $D^{(2)}$ denote the $(m+n)\times(m+n)$ diagonal matrix, the $i^{th}$ diagonal element of which is defined $D_i^{(2)}=\sum_{j=1}^{m+n} A_{i,j}^{(2)}$, $i=1, \ldots, m+n$, where $A_{i,j}^{(2)}$ is the element of $A^{(2)}$ in the $i^{th}$ row and the $j^{th}$ column. Similar as $A^{(2)}$, $D^{(2)}$ has the following block structure.

$$D^{(2)} = \begin{bmatrix} D^{(2,1)} & 0_{(m+\epsilon n)\times(n-\epsilon n)} \\ 0_{(n-\epsilon n)\times(m+\epsilon n)} & D^{(2,2)} \end{bmatrix}$$

where $D^{(2,1)}$ and $D^{(2,2)}$ are diagonal matrices whose diagonal elements are equal to the row sums and the column sums of $A^{(2,1)}$ respectively. Finally, let $S^{(2)}$ denote the normalized affinity matrix $S^{(2)}=(D^{(2)})^{-1/2}A^{(2)}(D^{(2)})^{-1/2}$, which also has the following block structure.

$$S^{(2)} = \begin{bmatrix} 0_{(m+\epsilon n)\times(m+\epsilon n)} & S^{(2,1)} \\ (S^{(2,1)})^T & 0_{(n-\epsilon n)\times(n-\epsilon n)} \end{bmatrix}$$

where $S^{(2,1)} = (D^{(2,1)})^{-\frac{1}{2}} A^{(2,1)} (D^{(2,2)})^{-\frac{1}{2}}$.

2.2 Objective Function $Q_2$

Above were introduced, a tripartite graph which propagates the label information from the labeled nodes to the unlabeled nodes via the feature nodes;

a bipartite graph which puts high weights on the edges connecting examples from the same domain and low weights on the edges connecting examples from different domains.

In this section, the two graphs are combined to design objective function $Q_2$. By minimizing $Q_2$, a smooth classification function is obtained for the unlabeled examples in the target domain. This function relies more on the labeled examples from the target domain than on those from the source domain.

For the sake of simplicity, define $g=[(f^L)^T,(f^U)^T]^T$. It is easy to see that $g=Bf$, where $B=[I_{(m+n)\times(m+n)}, 0_{(m+n)\times d}]$. Thus the objective function $Q_2$ can be written as follows.

$$Q_2(f) = \frac{1}{2}\gamma \sum_{i,j=1}^{m+n+d} A_{i,j}^{(3)} \left(\frac{f_i}{\sqrt{D_i^{(3)}}} - \frac{f_j}{\sqrt{D_j^{(3)}}}\right)^2 +$$

$$\frac{1}{2}\tau \sum_{i,j=1}^{m+n} A_{i,j}^{(2)} \left(\frac{g_i}{\sqrt{D_i^{(2)}}} - \frac{g_j}{\sqrt{D_j^{(2)}}}\right)^2 +$$

$$\mu \sum_{i=1}^{m+n+d} (f_i - y_i)^2$$

$$= \gamma f^T(I_{(m+n+d)\times(m+n+d)} - S^{(3)})f +$$

$$\tau f^T B^T (I_{(m+n)\times(m+n)} - S^{(2)}) Bf + \mu\|f-y\|^2$$

where $\gamma$ and $\tau$ are two positive parameters. Similar as in $Q_1$, the first term of $Q_2$, $\gamma f^T(I_{(m+n+d)\times(m+n+d)}-S^{(3)})f$, measures the label smoothness of f on the tripartite graph; the second term, $\tau f^T B^T(I_{(m+n)\times(m+n)}-S^{(2)})Bf$, measures the label smoothness of f on the bipartite graph; and the third term, $\mu\|f-y\|^2$, measures the consistency of $f$ with the label information and the prior knowledge. It should be pointed out that the first two terms in $Q_2$ can be combined mathematically; however, the two graphs can not be combined due to the normalization process.

$Q_2$ differs from semi-supervised learning, which treats the labeled examples from different domains in the same way. The disclosed embodiment, by imposing the label smoothness constraint on the bipartite graph, gives more impact to the labeled examples from the target domain on the unlabeled examples from the same domain than it gives to the labeled examples from the source domain. The next section presents results of comparative experiments comparing the disclosed embodiment with a state of the art semi-supervised learning method.

In the following, $f^L=y^L$, and $Q^2$ is minimized with respect to $f^U$ and $f^F$. The solutions can be obtained by the following lemma.

LEMMA 2. If $f^L=y^L$, $Q_2$ is minimized at $$\hat{f}^{U*} = \left((\gamma+\tau+\mu)I_{(n-\epsilon n)\times(n-\epsilon n)} - \frac{\gamma^2}{\gamma+\mu}S^{(3,2)}(S^{(3,2)})^T\right)^{-1} \quad (5)$$

$$\left(\mu y^U + \frac{\gamma^2}{\gamma+\mu}S^{(3,2)}(S^{(3,1)})^T y^L + \frac{\gamma\mu}{\gamma+\mu}S^{(3,2)}y^F + \tau(S^{(2,1)})^T y^L\right)$$

-continued $$\hat{f}^{F*} = \frac{\gamma}{\gamma+\mu}((S^{(3,1)})^T y^L + (S^{(3,2)})^T \hat{f}^{U*}) + \frac{\mu}{\gamma+\mu} y^F \quad (6)$$

In Equation 5, ignoring the matrix inversion term in the front, it can be seen that $\hat{f}^{U*}$ gets the label information from the labeled nodes through the following two terms:

$$\frac{\gamma^2}{\gamma+\mu} S^{(3,2)} (S^{(3,1)})^T y^L$$

and $\tau(S^{(2,1)})^T y^L$, which come from the tripartite graph and the bipartite graph respectively. Recall that $y^L$ is defined on the labeled nodes from both the source domain and the target domain. In particular, if a labeled node is from the target domain, its corresponding row in $S^{2,1}$ would have large values, and it will make a big contribution to $\hat{f}^{U*}$ via $\tau(S^{(2,1)})^T y^L$. This is in contrast to labeled nodes from the source domain, whose corresponding rows in $S^{2,1}$ have small values, and their contribution to $\hat{f}^{U*}$ would be small as well.

Similar to the objective function $Q_1$, an iterative algorithm can be implemented by the skilled artisan to find the solutions of $Q_2$. However, the following focuses on the relationship between $Q_1$ and $Q^2$, and introduces an iterative algorithm based on the TRITER algorithm to solve $Q^2$.

Equations 1 and 5 are very similar to each other. The following theorem builds a connection between objective functions $Q^1$ and $Q^2$.

Theorem 2. If $f_L = y_L$, then $\hat{f}^{U*}$ can be obtained by minimizing $Q^1$ with the following parameterization $$\alpha' = \frac{\gamma}{\sqrt{(\mu+\gamma)(\mu+\gamma+\tau)}}$$

$$y'^L = y^L$$

$$y'^U = \frac{\mu y^U + \tau(S^{(2,1)})^T y^L}{\mu+\gamma+\tau-\gamma\sqrt{\frac{\mu+\gamma+\tau}{\mu+\gamma}}}$$

$$y'^F = \frac{\mu}{\sqrt{(\mu+\gamma)(\mu+\gamma+\tau)} - \gamma} y^F$$

The most significant difference between the parameter settings in Theorem 2 and the original settings is in the definition of $y'^U$. That is, $y'^U$ consists of two parts, one from its own prior information, which is in proportion to $\mu y^U$, and the other from the label information of the labeled examples, which is in proportion to $\tau(S^{(2,1)})^T y^L$. The second part is obtained via the bipartite graph and it encodes the domain information. In other words, incorporating the bipartite graph into the transfer learning framework is equivalent to working with the tripartite graph alone, with a domain specific prior for the unlabeled examples in the target domain and slightly modified versions of $\alpha$ and $y^F$.

Finally, to minimize $Q^2$, the TRITER algorithm can be applied with the parameter settings specified in Theorem 2, which usually converges within 30 iteration steps.

3. EXPERIMENTAL RESULTS

This section presents some experimental results, and compares the proposed graph-based transfer learning framework with state-of-the-art techniques.

3.1 Experiment Settings

To demonstrate the performance of the proposed graph-based transfer learning framework, experiments were performed in the following 3 areas.

Sentiment classification ("SC"). Movie and product review data set are used. The movie reviews come from B. Pang, L. Lee, and S. Vaithyanathan, "Thumbs up? sentiment classification using machine learning techniques," CoRR, cs.CL/0205070, 2002. Positive labels are assigned to ratings above 3.5 stars and negative to 2 and fewer stars. The product reviews are collected from Amazon for software worth more than 50 dollars. These experiments use the movie reviews as the source domain and the product reviews as the target domain. After stemming and stop word removal, the feature space is 34305-dimensional.

B. Document classification ("DC"). This experiment uses the 20 newsgroups data set J. Rennie. 20 newsgroups. In http://people.csail.mit.edu/jrennie/20Newsgroups/, 2007. The documents within this data set have a two-level categorical structure. Based on this structure, 3 transfer learning tasks were generated. Each task involves distinguishing two higher-level categories. The source domain and the target domain contain examples from different lower-level categories.

For example, one transfer learning task is to distinguish between rec and talk. The source domain contains examples from rec.sport.baseball and talk.politics.misc; whereas the target domain contains examples from rec.sport.hockey and talk.religion.misc. The way that the transfer learning tasks are generated is similar to J. Gao, W. Fan, J. Jiang, and J. Han, "Knowledge transfer via multiple model local structure mapping," KDD, pages 283-291, 2008; and W. Dai, G.-R. Xue, Q. Yang, and Y. Yu, "Co-clustering based classification for out-of-domain documents," KDD, pages 210-219, 2007. After stemming and stop word removal, the feature space is 53975-dimensional.

C. Intrusion detection ("ID"). In intrusion detection, the examples correspond to the connections, both normal connections and abnormal connections (attacks). Here, 34 continuous features are used, such as "same host" features, "same service" features, the number of failed login attempts.

The input data is used to generate the tripartite graph and the bipartite graph. In the flowcharts, the smoothing operation is on the graphs, and the consistency is between the true class labels and the predicted class labels, i.e., the values of the function defined on the unlabeled examples in the target domain, which is obtained in the iterative process.

In this area, the KDD Cup 99 data set is used from [1]. It consists of both normal connections and attacks of different types, including DOS (denial-of-service), R2L (unauthorized access from a remote machine), U2R (unauthorized access to local superuser privileges), and probing (surveillance and other probing). For this data set, 3 transfer learning tasks were also generated. In each task, both the source domain and the target domain contain some normal examples as the positive class, but the negative class in the two domains corresponds to different types of attacks. Similar as in [9], only the 34 continuous features are used.

The details of the transfer learning tasks are summarized in Table 1. In SC and DC, both binary features and tfidf features were tried. Binary features led to better performance. Therefore, only experimental results with the binary features are reported here. The features in ID are not binary.

In the present proposed transfer learning framework, the bipartite graph is constructed as follows. $A^{(2,1)}$ is a linear combination of two matrices. The first matrix is based on domain information, i.e. its element is set to 1 iff the corresponding labeled and unlabeled examples are both from the target domain, and it is set to 0 otherwise. The second matrix is $A^{(3,1)}(A^{(3,2)})^T$, i.e. if a labeled example shares a lot of features with an unlabeled example, the corresponding element in this matrix is large. This is only one way of constructing the bipartite graph with domain information. Exploring the optimal bipartite graph for transfer learning is beyond the scope of this paper.

The following methods will be compared with the embodiments described above.

Learning from the target domain only, which is denoted target only and represented with square data points in the figures. This method ignores the source domain, and constructs the classification function solely based on the labeled examples from the target domain. In other words, none of the nodes in the tripartite graph and bipartite graph correspond to examples from the source domain.

II. Learning from the source domain only, which is denoted source only and represented with asterisk data points in the figures. This method, ignores the label information from the target domain, and constructs the classification function solely based on the labeled examples from the source domain. In other words, all of the nodes on the left hand side of the tripartite graph and the bipartite graph correspond to examples from the source domain, and the nodes that correspond to the target domain examples are all on the right hand side of the two graphs.

III. Learning from both the source domain and the target domain, which is denoted source+target and represented with x's for data points in the figures. This method, combines the function $f^U$ output by target only and source only linearly, and predicts the class labels of the unlabeled examples accordingly.

IV. Traditional semi-supervised learning, denoted "semi-supervised." It is based on the manifold ranking algorithm and represented with plus signs for data points in the figures D. Zhou, J. Weston, A. Gretton, O. Bousquet, and B. Scholkopf, "Ranking on data manifolds," NIPS, 2003. With this method, all the labeled examples are considered from the target domain, and their label information was propagated to the unlabeled examples in the same way. A typical semi-supervised learning algorithm uses both labeled and unlabeled data; however, it does not involve multiple domains and does not leverage the information from the source domain to help us understand the target domain. The manifold ranking algorithm is such an algorithm. On the other hand, the iterative algorithm of the embodiment of the present disclosure uses both the labeled data and the unlabeled data, and it leverages the label information from the source domain to help build the classifier in the target domain. Therefore, it is a semi-supervised transfer learning algorithm.

V. The transfer learning toolkit developed by UC Berkeley (http://multitask.cs.berkeley.edu/). The method used was based on R. K. Ando and T. Zhang, "A framework for learning predictive structures from multiple tasks and unlabeled data," Journal of Machine Learning Research, 6:1817-1853, 2005, which is denoted BTL and represented with diamond shaped data points in the figures. For document classification and sentiment classification, the feature space is too large to be processed by BTL. Therefore, as a preprocessing step, singular value decomposition ("SVD") is performed to project the data onto the 100-dimensional space spanned by the first 100 singular vectors.

VI. The boosting-based transfer learning method W. Dai, Q. Yang, G.-R. Xue, and Y. Yu, "Boosting for transfer learning," ICML, pages 193-200, 2007, which is denoted TBoost and represented with inverted triangles for data points in the figures.

3.2 Evaluations

Figure 6:
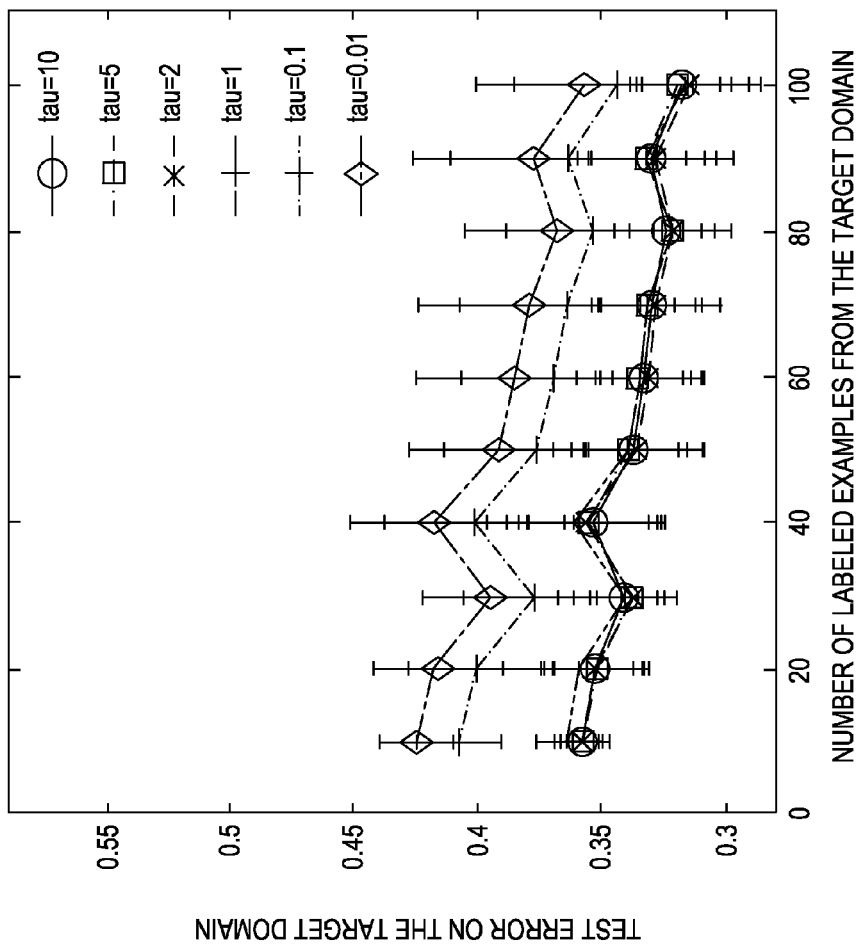
FIG. 6 shows experimental results relating to Impact of $\tau$ on the performance of the proposed method.
Figure 7:
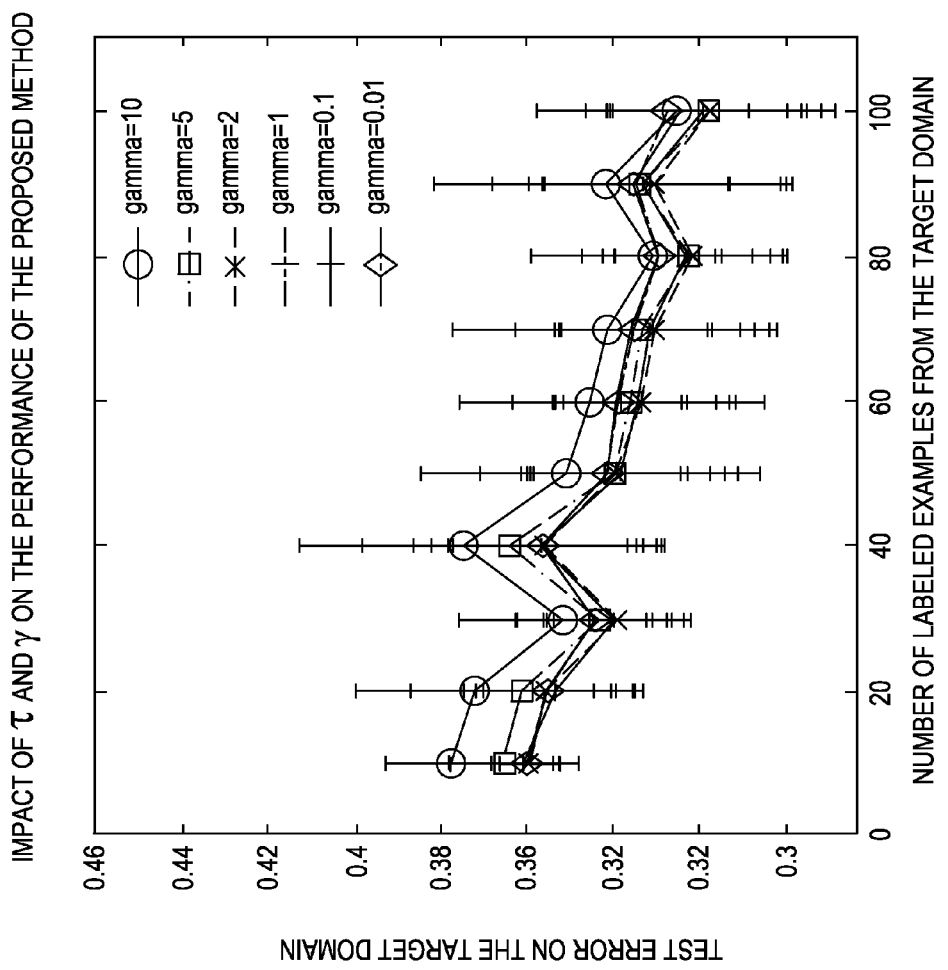
FIG. 7 shows experimental results relating to Impact of $\gamma$ on the performance of the proposed method
Figure 8:
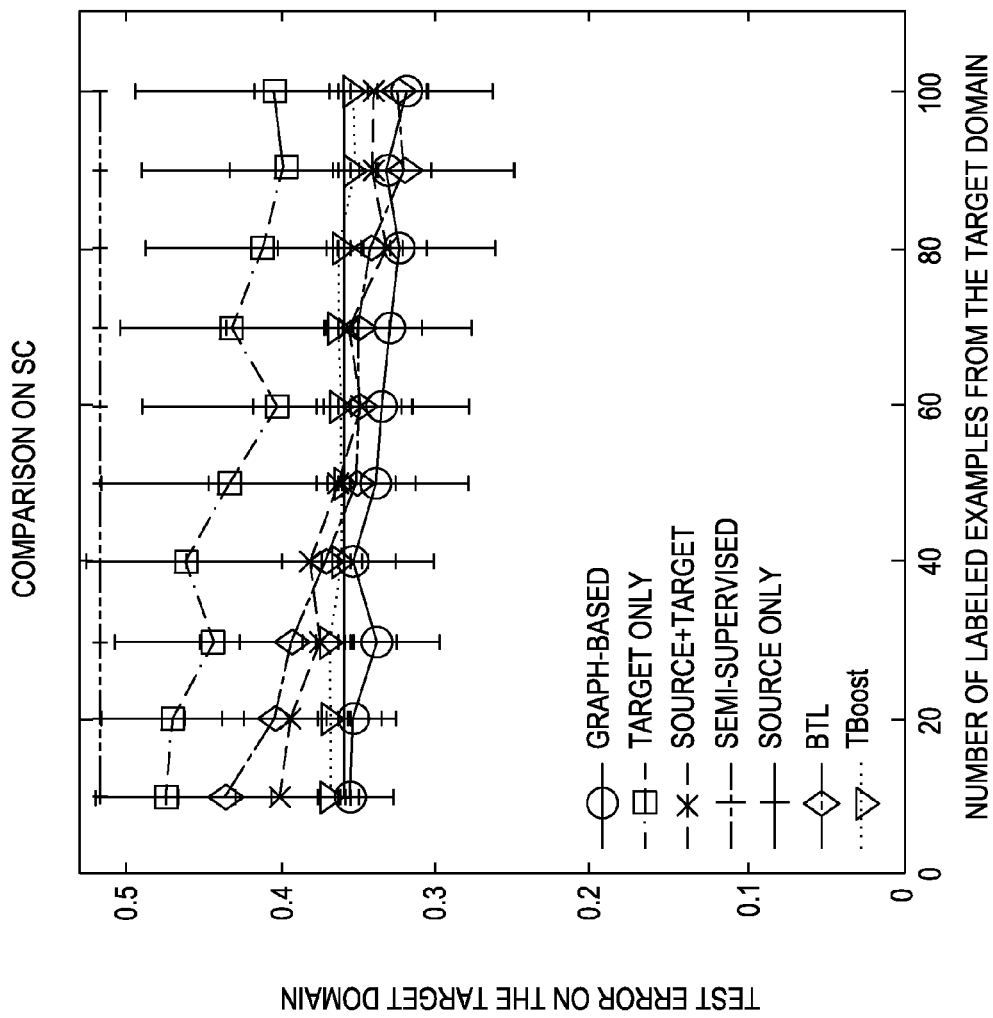
FIG. 8 shows a comparison of various methods with respect to sentiment classification.
Figure 9:
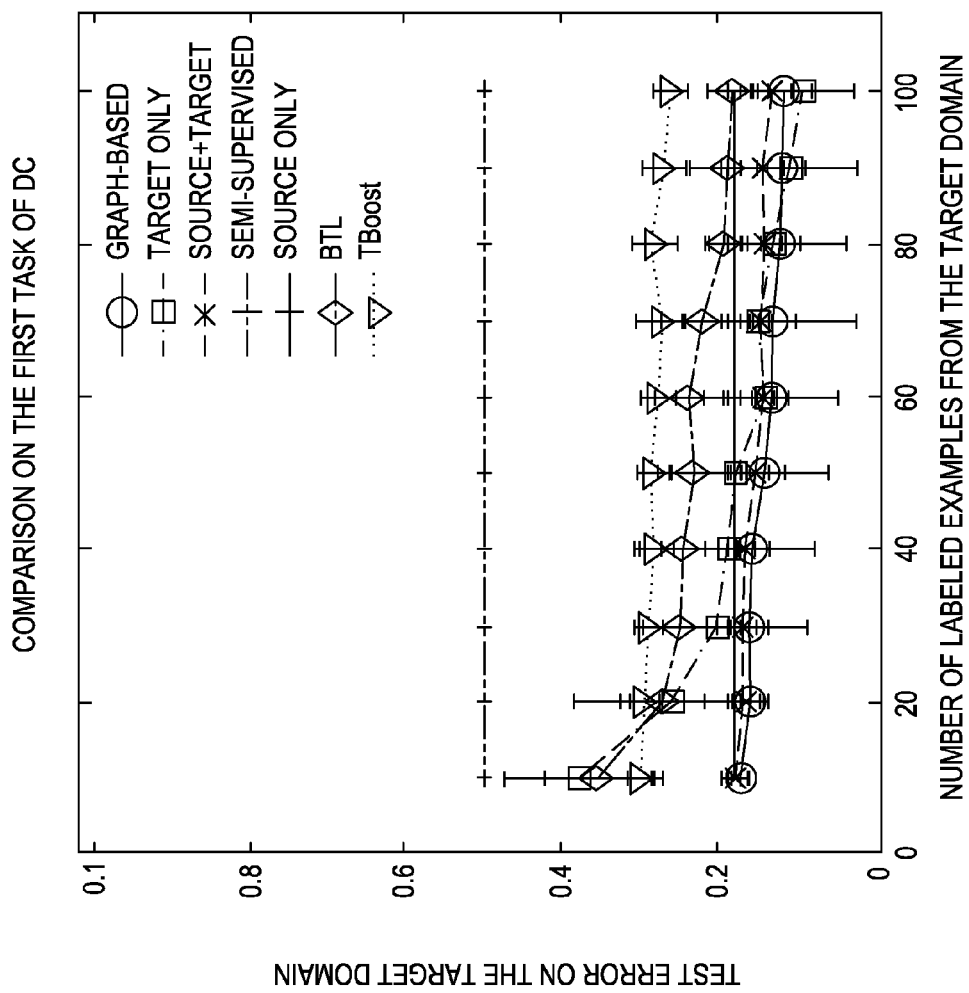
FIG. 9 shows a comparison of various methods with respect to a first document classification task.
Figure 10:
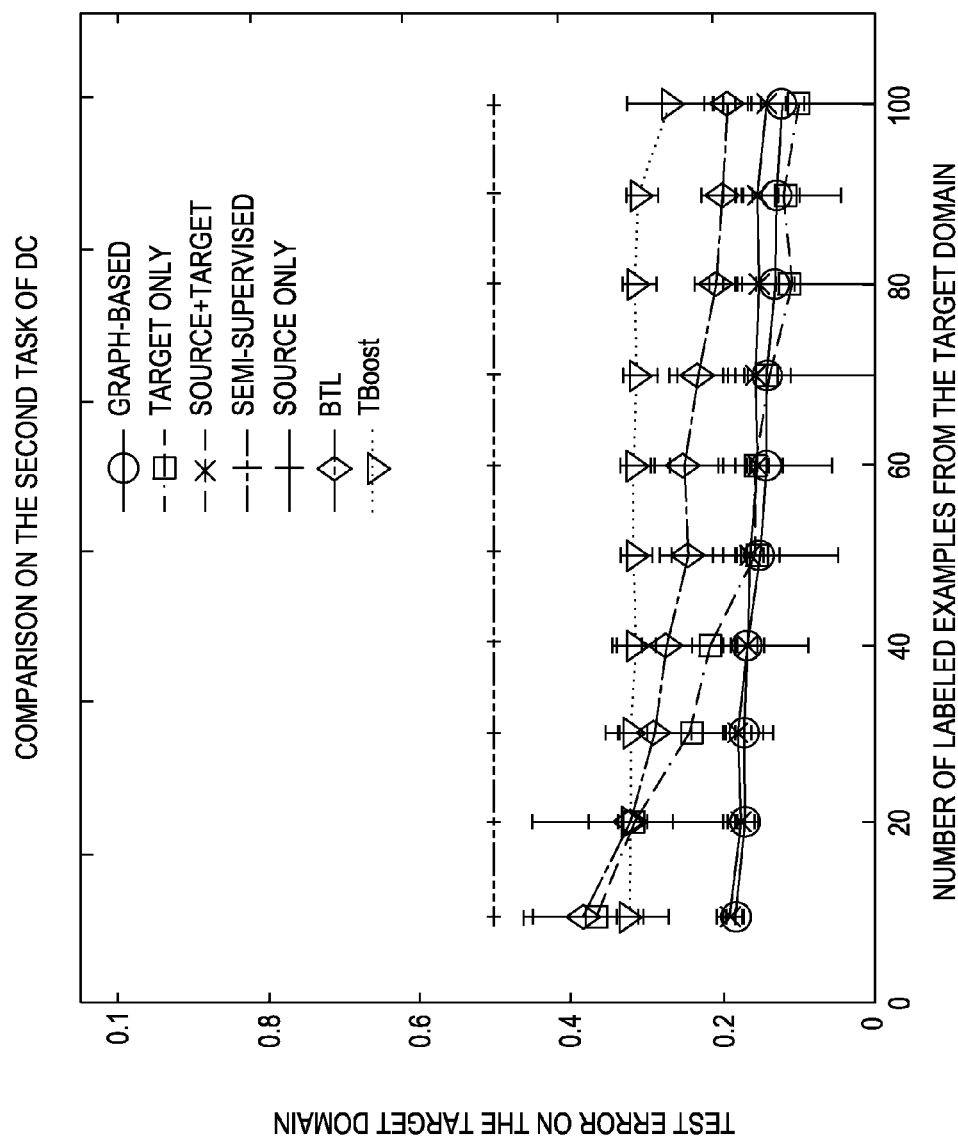
FIG. 10 shows a comparison of various methods with respect to a second document classification task.
Figure 11:
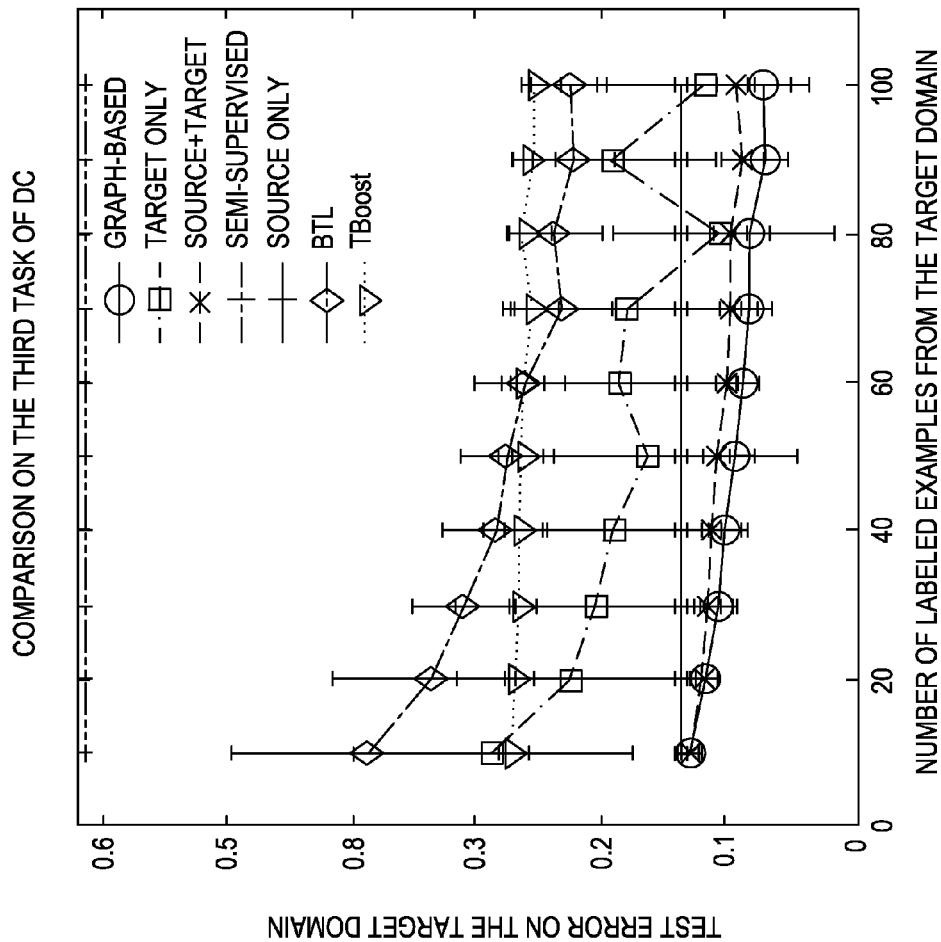
FIG. 11 shows a comparison of various methods with respect to a third document classification task.
Figure 12:
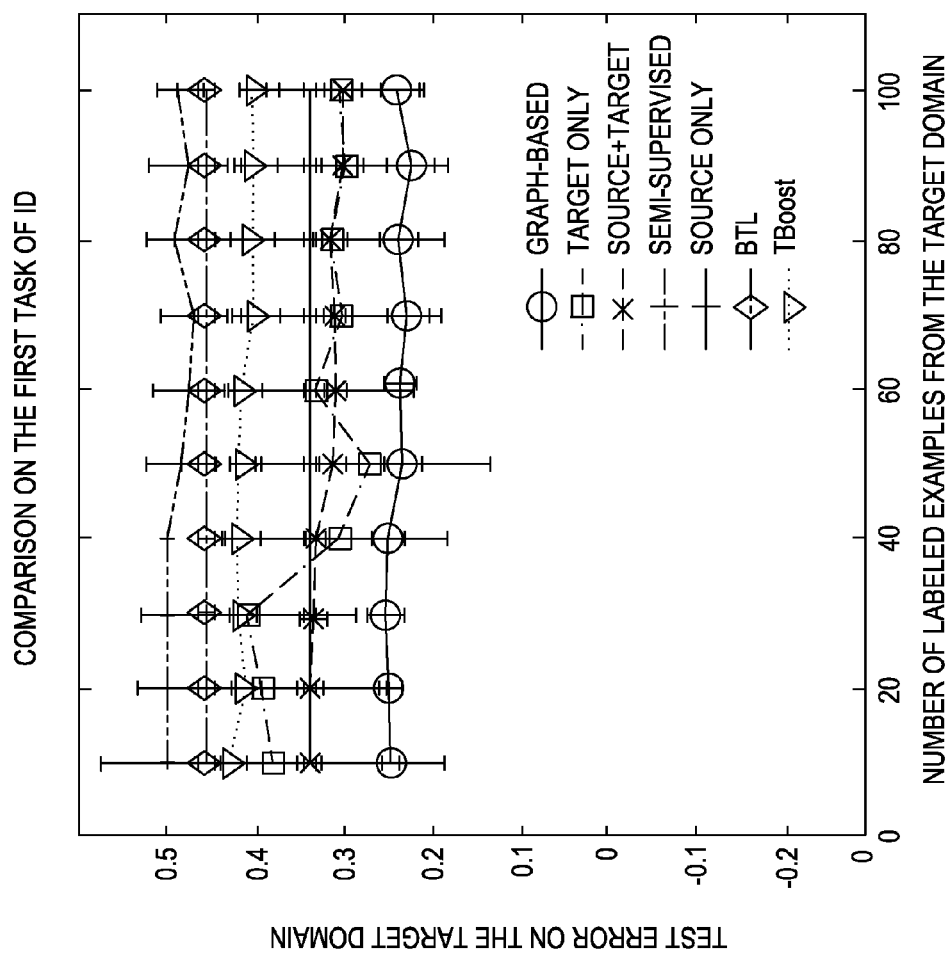
FIG. 12 shows a comparison of various methods with respect to an intrusion detection task.
Figure 13:
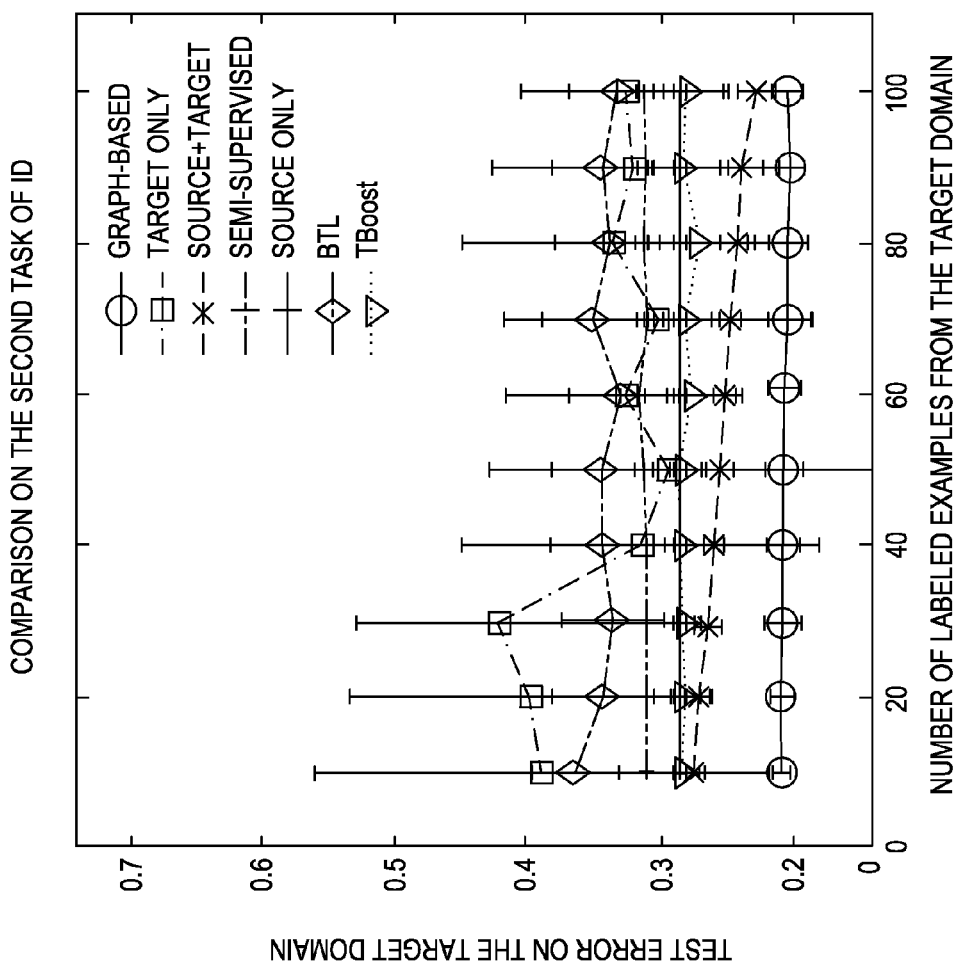
FIG. 13 shows a comparison of various methods with respect to a second intrusion detection task.
Figure 14:
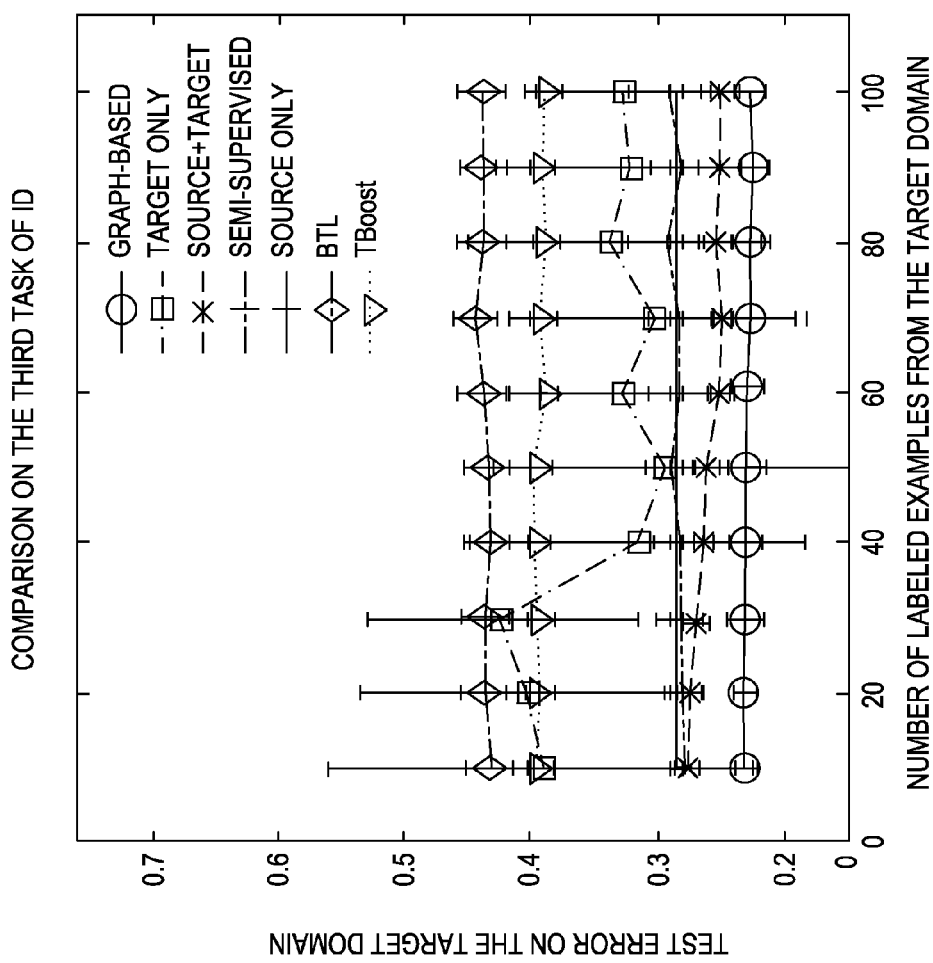
FIG. 14 shows a comparison of various methods with respect to a third intrusion detection task.

For the graph-based transfer learning framework, $\mu=0.01$, which is consistent with D. Zhou, J. Weston, A. Gretton, O. Bousquet, and B. Scholkopf, "Ranking on data manifolds." NIPS, 2003., $y^F=0$, and $y^U=0$ in all the experiments. For $\tau$ and $\gamma$, impact on performance is tested using SC, which is shown in FIGS. 6 and 7. These figures, show that the performance of the method of the present disclosure is quite stable within a wide range of $\tau$ and $\gamma$. Therefore, in the following experiments, the values $\tau=5$ and $\gamma=1$ are chosen.

FIGS. 8 through 14 compare the proposed graph-based transfer learning framework with the baseline methods on the 7 transfer learning tasks. In these figures, the x-axis is the number of labeled examples from the target domain, and the y-axis is the average test error in the target domain over 20 runs (labeled examples from the target domain are randomly picked in each run). The error bars are also shown in these figures.

Based on these results, the following observations may be made. First of all, the graph-based method, with circles for data points, is the best of the 7 methods in all the tasks in terms of the average error rate. Second, the graph-based method is very stable in terms of the small error bars, especially compared with target only. This is consistent with the intuition since target only totally ignores the source domain, and only uses the label information from the target domain to construct the classification function. When the number of labeled examples from the target domain is small, its performance varies a lot depending on the specific labeled examples. In contrast, the graph-based method considers the label information from both the source domain and the target domain, therefore, it is not very sensitive to the specific labeled examples from the target domain. Third, the performance of semi-supervised was much worse than the framework presented herein. This is because in all these experiments, the number of labeled examples from the target domain is much smaller than that from the source domain, which is quite common in practice. Therefore, with semi-supervised, the labeled examples from the target domain are flooded by those from the source domain, and the performance is not satisfactory. Fourth, in most of the experiments, the average performance of the graph-based method and target only improves with increase the number of labeled examples from the target domain. This is because with the graph-based method, the labeled examples from the target domain have more impact on the classification function than those from the source domain. As the number of labeled examples from the target domain increases, their impact tends to dominate. So the performance of the graph-based method and target only will get closer. Finally, in some experiments, such as FIG. 9 and FIG. 11, the gap between the graph-based method and source+target is larger. This is reasonable since in source+target, the source domain and the target domain are combined in a naive way. So the performance gain caused by more labeled examples from the target domain is not as significant as the graph-based method.

4. RELATED WORK

This section discusses further state of the art documents on transfer learning in machine learning research.

One of the early attempts aimed to achieve better generalization performance by jointly modeling multiple related learning tasks, and transferring information among them, i.e.

multi-task learning J. Baxter, "A bayesian/information theoretic model of learning to learn via multiple task sampling," Mach. Learn., 28(1):7-39, 1997; R. Caruana, "Multitask learning." Machine Learning, Vol. 28, pages 41-75, 1997; S. Thrun, "Is learning the n-th thing any easier than learning the first?" NIPS, pages 640-646. MIT Press, 1996. It usually tackles the problem where the feature space and the feature distribution P(x) are identical whereas the labeling functions are different.

Further developments in the area include combining labeled data from the source domain with labeled or unlabeled data from the target domain, which leads to transfer learning methods for k-nearest neighbor S. Thrun, "Is learning the n-th thing any easier than learning the first?" NIPS, pages 640-646. MIT Press, 1996; support vector machines P. Wu and T. G. Dietterich, "Improving svm accuracy by training on auxiliary data sources," ICML, pages 871-878, 2004; and logistic regression X. Liao, Y. Xue, and L. Carin, "Logistic regression with an auxiliary data source," ICML, pages 505-512, 2005. Another line of research focuses on Bayesian logistic regression with a Gaussian prior on the parameters R. K. Ando and T. Zhang, "A framework for learning predictive structures from multiple tasks and unlabeled data," Journal of Machine Learning Research, 6:1817-1853, 2005; S.-I. Lee, V. Chatalbashev, D. Vickrey, and D. Koller, "Learning a meta-level prior for feature relevance from multiple related tasks," ICML, pages 489-496, 2007. There are also specialized transfer learning techniques for certain application areas, such as adapting context-free grammar B. Roark and M. Bacchiani, "Supervised and unsupervised PCFG adaptation to novel domains," NAACL, pages 126-133, 2003; speech recognition J. luc Gauvain and C. hui Lee, "Maximum a posteriori estimation for multivariate Gaussian mixture observations of Markov chains," IEEE Transactions on Speech and Audio Processing, 2:291-298, 1994; and sentiment prediction J. Blitzer, M. Dredze, and F. Pereira, "Biographies, bollywood, boom-boxes and blenders: Domain adaptation for sentiment classification," ACL, 2007.

Transfer learning is closely related to concept drifting in stream mining, in which the statistical properties of the target variable change over time. These changing properties might be the class prior P(y), the feature distribution P(x|y), the decision function P(y|x) or a combination of all. Multiple approaches have been developed, such as ensemble approaches H. Wang, W. Fan, P. S. Yu, and J. Han, "Mining concept-drifting data streams using ensemble classifiers," KDD '03, 200; co-clustering W. Dai, G.-R. Xue, Q. Yang, and Y. Yu, "Co-clustering based classification for out-of-domain documents," KDD, pages 210-219, 2007; and local structure map J. Gao, W. Fan, J. Jiang, and J. Han; "Knowledge transfer via multiple model local structure mapping," KDD, pages 283-291, 2008. Transfer learning is also relevant to sample bias correction, which is mostly concerned with distinct training distribution $P(x|\lambda)$ and testing distribution $P(x|\theta)$ with unknown parameters $\lambda$ and $\theta$. Several bias correction methods have been developed based on estimating the probability that an example is selected into the sample and using rejection sampling to obtain unbiased samples of the correct distribution B. Zadrozny and C. Elkan, "Learning and making decisions when costs and probabilities are both unknown," KDD, pages 204-213, New York, N.Y., USA, 2001. ACM; B. Zadrozny, "Learning and evaluating classifiers under sample selection bias," ICML, page 114, 2004; W. Fan, I. Davidson, B. Zadrozny, and P. S. Yu, "An improved categorization of classifier's sensitivity on sample selection bias," ICDM, pages 605-608, Washington, D.C., USA, 2005, IEEE Computer Society.

The framework herein is motivated by the graph-based methods for semi-supervised learning X. Zhu, Z. Ghahramani, and J. Lafferty, "Semi-supervised learning using Gaussian fields and harmonic functions," ICML, pages 912-919, 2003; D. Zhou, J. Weston, A. Gretton, O. Bousquet, and B. Scholkopf, "Ranking on data manifold," NIPS, 2003. In the framework, the tripartite graph propagates the label information from the source domain to the target domain via the features, and the bipartite graph makes better use of the label information from the target domain. This framework is fundamentally different from previous work on transfer learning and related areas. It propagates the label information in a principled way, which is in contrast to some ad-hoc methods based on pivot features J. Blitzer, M. Dredze, and F. Pereira, "Biographies, bollywood, boom-boxes and blenders: Domain adaptation for sentiment classification," ACL, 2007; it directly associates the polarity of features with the class labels of all the examples, which is in contrast to previous graph-based methods Q. Liu, X. Liao, and L. Carin, "Semi-supervised multitask learning," NIPS, 2007; J. Gao, W. Fan, J. Jiang, and J. Han, "Knowledge transfer via multiple model local structure mapping," KDD, pages 283-291, 2008 that do not model this relationship with the graph structure.

5. CONCLUSION

Herein, a new graph-based framework for transfer learning is based on both a tripartite graph and a bipartite graph. The tripartite graph includes three types of nodes, and it propagates the label information via the features. The bipartite graph consists of two types of nodes, and it imposes the domain related smoothness constraint between the labeled examples and the unlabeled examples. The two graphs led to an objective function $Q_2$, which is a weighted combination of the label smoothness on the tripartite graph, the label smoothness on the bipartite graph, and the consistency with the label information and the prior knowledge. Closed form solutions to $Q^2$ have been developed. Furthermore, a connection was developed between $Q_2$ and an objective function $Q^1$, which is solely based on the tripartite graph. Finally, based on the above connection, an iterative algorithm to find the solutions to $Q_2$ was designed. Different from existing transfer learning methods, the proposed framework propagates the label information to both the features irrelevant to the source domain and the unlabeled examples from the target domain via the common features in a principled way. Experimental results on several transfer learning tasks demonstrate the superiority of the proposed framework over state-of-the-art techniques.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Moreover, operations may be distributed over multiple processors and operations illustrated as distinct may be combined into a single operation.

From reading the present disclosure, other modifications will be apparent to persons skilled in the art. Such modifications may involve other features which are already known in the design, manufacture and use of machine learning and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

The word "comprising", "comprise", or "comprises" as used herein should not be viewed as excluding additional elements. The singular article "a" or "an" as used herein should not be viewed as excluding a plurality of elements. Unless the word "or" is expressly limited to mean only a single item exclusive from other items in reference to a list of at least two items, then the use of "or" in such a list is to be interpreted as including (a) any single item in the list, (b) all of the items in the list, or (c) any combination of the items in the list. Use of ordinal numbers, such as "first" or "second," is for distinguishing otherwise identical terminology, and is not intended to imply that operations or steps must occur in any particular order, unless otherwise indicated.

Where software or algorithms are disclosed, anthropomorphic or thought-like language may be used herein. There is, nevertheless, no intention to claim human thought or manual operations, unless otherwise indicated. All claimed operations are intended to be carried out automatically by hardware or software.

The invention claimed is:

1. A computer method, comprising carrying out operations on a computer, the operations comprising:
    maintaining machine readable embodiments on a medium of a bipartite graph and a tripartite graph,
        the tripartite graph comprising
            a first plurality of nodes corresponding to labeled and unlabeled examples from source and target domains;
            a second plurality of nodes corresponding to features; and
            a first plurality of edges connecting
                the nodes corresponding to the features
                to the nodes corresponding to the examples
                according to whether the features appear in the examples or not;
        the bipartite graph comprising
            the first plurality of nodes corresponding to the examples; and
            a second plurality of edges connecting the examples, the edges being associated with indications that indicate whether connected examples are in a same domain or not;
    deriving labels for at least one target domain based on the tripartite and bipartite graphs; and
    presenting an embodiment of the labels as a result, wherein said deriving comprises:
        formulating an objective function based on said bipartite and tripartite graphs, said objective function encompassing smoothness and consistency constraints and providing label information in the target domain at least responsive to label information in the source domain;
        applying the objective function to the all examples, whether labeled or unlabeled, and all features in order to obtain at least one result relative to the unlabeled examples;
        minimizing the objective function to yield a label function; and
        providing output labels responsive to the label function.

2. The method of claim 1, wherein the labels in the source domain are related to a first field of application, while the labels in the target domain are related to a second field of application.

3. The method of claim 1, wherein initially the labels represent sentiments expressed by users with respect to examples, while derived labels represent anticipated sentiments with respect to unlabelled examples.

4. The method of claim 1, wherein initially the labels represent known document classifications with respect to examples, while derived labels represent anticipated document classifications with respect to unlabelled examples.

5. The method of claim 1, wherein initially the labels represent known intrusion detection results with respect to examples, while derived labels represent anticipated intrusion detection results with respect to unlabelled examples.

6. The method of claim 1, wherein deriving takes into account labels from both the target and source domains, but weights the labels from the target domain more heavily in determining derived labels for unlabelled examples in the target domain.

7. The method of claim 1, wherein the examples are machine readable embodiments of documents; and the features are machine embodiments of words within the documents.

8. The method of claim 1, wherein deriving comprises imposing at least one smoothness constraint on the graphs.

9. The method of claim 1, wherein deriving comprises imposing at least one label consistency constraint on the graphs.

10. The method of claim 1, wherein said minimizing comprises
    using normalized affinity matrices for the tripartite and bipartite graphs, evaluating the label function on the unlabeled examples by:
        propagating label information through the features to the unlabeled examples; and
        combining with prior information for the unlabeled examples
    using the graph structures, evaluating the label function on the features by:
        propagating label information from the labeled examples to the features;
        propagating label information calculated in accordance with the label function from previously unlabeled examples to the features; and
        combining with prior information for the features.

11. The method of claim 1, wherein the objective function is a weighted combination of label smoothness on the tripartite graph, label smoothness on the bipartite graph, and consistency with the label information and the prior knowledge.

12. The method of claim 9, wherein the label function yields a positive or negative result for unlabelled examples.

13. A computer program product for carrying out operations, the computer program product comprising a non-transitory storage medium readable by a processing circuit and storing instructions to be run by the processing circuit for performing a method comprising:
maintaining machine readable embodiments on a medium of a bipartite graph and a tripartite graph,
the tripartite graph comprising
a first plurality of nodes corresponding to labeled and unlabeled examples from source and target domains;
a second plurality of nodes corresponding to features; and
a first plurality of edges connecting the nodes corresponding to the features to the nodes corresponding to the examples according to whether the features appear in the examples or not;
the bipartite graph comprising
the first plurality of nodes corresponding to the examples; and
a second plurality of edges connecting the examples, the edges being associated with indications that indicate whether connected examples are in a same domain or not;
deriving labels for at least one target domain based on the tripartite and bipartite graphs; and
presenting an embodiment of the labels as a result, wherein said deriving comprises:
formulating an objective function based on said bipartite and tripartite graphs, said objective function encompassing smoothness and consistency constraints and providing label information in the target domain at least responsive to label information in the source domain;
applying the objective function to the all examples, whether labeled or unlabeled, and all features in order to obtain at least one result relative to the unlabeled examples;
minimizing the objective function to yield a label function; and providing output labels responsive to the label function.

14. The program product of claim 13, wherein the labels in the source domain are related to a first field of application, while the labels in the target domain are related to a second field of application.

15. The program product of claim 13, wherein deriving takes into account labels from both the target and source domains, but weights the labels from the target domain more heavily in determining derived labels for unlabelled examples in the target domain.

16. The program product of claim 13, wherein the examples are machine readable embodiments of documents; and the features are machine embodiments of words within the documents.

17. The program product of claim 13, wherein said minimizing comprises using normalized affinity matrices for the tripartite and bipartite graphs,
evaluating the label function on the unlabeled examples by:
propagating label information through the features to the unlabeled examples; and
combining with prior information for the unlabeled examples;
using the graph structures, evaluating the label function on the features by:
propagating label information from the labeled examples to the features;
propagating label information calculated in accordance with the label function from previously unlabeled examples to the features; and
combining with prior information for the features.

18. The program product of claim 13, wherein the objective function is a weighted combination of label smoothness on the tripartite graph, label smoothness on the bipartite graph, and consistency with the label information and the prior knowledge.

19. A system comprising:
at least one non-transitory medium for storing data and program code;
at least one processor for performing operations in conjunction with the medium, the operations comprising maintaining machine readable embodiments on a medium of a bipartite graph and a tripartite graph, the tripartite graph comprising
a first plurality of nodes corresponding to labeled and unlabeled examples from source and target domains;
a second plurality of nodes corresponding to features; and
a first plurality of edges connecting the nodes corresponding to the features to the nodes corresponding to the examples according to whether the features appear in the examples or not;
the bipartite graph comprising
the first plurality of nodes corresponding to the examples; and
a second plurality of edges connecting the examples, the edges being associated with indications that indicate whether connected examples are in a same domain or not;
deriving labels for at least one target domain based on the tripartite and bipartite graphs; and
presenting an embodiment of the labels as a result, wherein said deriving comprises:
formulating an objective function based on said bipartite and
tripartite graphs, said objective function encompassing smoothness and consistency constraints and providing label information in the target domain at least responsive to label information in the source domain;
applying the objective function to the all examples, whether labeled or unlabeled, and all features in order to obtain at least one result relative to the unlabeled examples;
minimizing the objective function to yield a label function; and providing output labels responsive to the label function.

20. The system of claim 19, wherein deriving takes into account labels from both the target and source domains, but weights the labels from the target domain more heavily in determining derived labels for unlabelled examples in the target domain.

21. The system of claim 19, wherein said minimizing comprises:
using normalized affinity matrices for the tripartite and bipartite graphs,
evaluating the label function on the unlabeled examples by:
propagating label information through the features to the unlabeled examples; and
combining with prior information for the unlabeled examples using the graph structures, evaluating the label function on the features by:

propagating label information from the labeled examples to the features;
propagating label information calculated in accordance with the label function from previously unlabeled examples to the features; and
combining with prior information for the features.

22. The system of claim 19, wherein deriving takes into account labels from both the target and source domains, but weights the labels from the target domain more heavily in determining derived labels for unlabelled examples in the target domain.

* * * * *